United States Patent
Le et al.

(10) Patent No.: US 10,899,598 B2
(45) Date of Patent: Jan. 26, 2021

(54) FLUID CONTROL SYSTEM AND METHOD

(71) Applicant: FLUIDMASTER, INC., San Juan Capistrano, CA (US)

(72) Inventors: Tuan Le, Fountain Valley, CA (US); Adam Sampson, Romana, CA (US)

(73) Assignee: FLUIDMASTER, INC., San Juan Capistrano, CA (US)

( * ) Notice: Subject to any disclaimer, the term of this patent is extended or adjusted under 35 U.S.C. 154(b) by 188 days.

(21) Appl. No.: 16/057,352

(22) Filed: Aug. 7, 2018

(65) Prior Publication Data

US 2019/0039877 A1 Feb. 7, 2019

Related U.S. Application Data

(60) Provisional application No. 62/542,556, filed on Aug. 8, 2017, provisional application No. 62/542,221, filed on Aug. 7, 2017.

(51) Int. Cl.
| | |
|---|---|
| *F16K 31/18* | (2006.01) |
| *B67D 7/02* | (2010.01) |
| *E03D 5/02* | (2006.01) |
| *E03D 3/12* | (2006.01) |

(52) U.S. Cl.
CPC ........... *B67D 7/02* (2013.01); *E03D 3/12* (2013.01); *E03D 5/024* (2013.01); *F16K 31/18* (2013.01)

(58) Field of Classification Search
CPC ............ E03D 3/12; E03D 5/024; F16K 31/18
USPC ........................................................ 4/358
See application file for complete search history.

(56) References Cited

U.S. PATENT DOCUMENTS

| | | |
|---|---|---|
| 2003/0061652 A1 | 4/2003 | Fish |
| 2006/0272081 A1 | 12/2006 | Tsutsui |
| 2008/0216225 A1 | 9/2008 | Juska |
| 2017/0175373 A1 | 6/2017 | Saruwatari |

FOREIGN PATENT DOCUMENTS

EP 0923691 B1 2/2003

OTHER PUBLICATIONS

International Search Report for International Application No. PCT/US18/45603, dated Nov. 28, 2018, 4 pages.
Written Opinion for International Application No. PCT/US18/45603, dated Nov. 28, 2018, 13 pages.

*Primary Examiner* — Christine J Skubinna
(74) *Attorney, Agent, or Firm* — Greenberg Traurig, LLP

(57) ABSTRACT

Some embodiments include a fluid control system with an outlet valve assembly, an inlet valve assembly including a venturi inlet valve, and an actuator coupled to the inlet valve assembly. In some embodiments, the actuator can enable a user to control a flush volume of fluid control system. Some embodiments include a moveable float positioned in a chamber of the outlet valve assembly, where the chamber includes a variably-sized upper portion with a volume that is based at least in part on a variable position of the moveable float in the chamber. Some embodiments include a adjustable control valves coupled to an outer surface of the outlet valve assembly and the inlet valve assembly. Some embodiments also include a bellows positioned in and coupled to the variably-sized upper portion. In some embodiments, the bellows are fluidly coupled to the venturi inlet valve and at least one of the control valves.

19 Claims, 26 Drawing Sheets

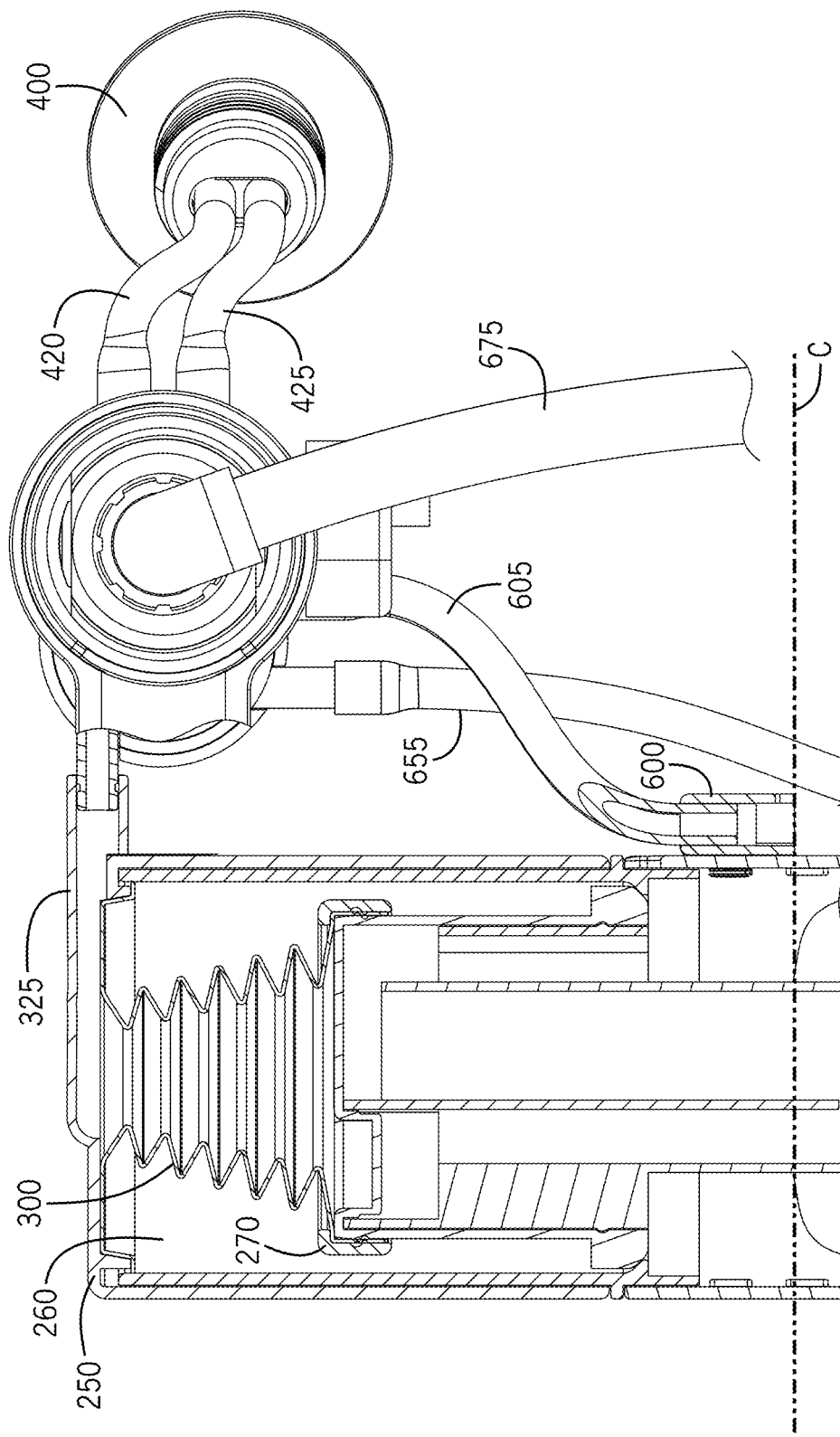

FLUID CONTROL SYSTEM AND METHOD

RELATED APPLICATIONS

This application claims priority to U.S. provisional application Ser. No. 62/542,221, filed on Aug. 7, 2017, and U.S. provisional application Ser. No. 62/542,556, filed on Aug. 8, 2017, the entire contents of which are incorporated herein by reference.

BACKGROUND

Water is becoming an increasingly scarce and valuable commodity across the globe, which has led to an increase in legislation to conserve water. Consequently, there is an increasing need in the industry to develop fluid control systems (e.g., such as flush systems of toilet tanks, and other fluid handling or delivery systems) that improve fluid transfer precision and/or efficiency, and/or that require and/or deliver lower fluid volumes (e.g., such as transferring fewer gallons per flush of a toilet system). In this race towards efficiency, there exists a need to provide a more precise and/or accurate flush volume control that can be adjusted as needed.

Inlet valves in fluidic systems typically provide and control the flow of a fluid (e.g., such as water) for refilling a fluid reservoir, and/or for delivering the fluid from a storage reservoir tank (e.g., such as from a tank to a bowl during a flush cycle of a toilet system). Current inlet valves typically use floats that are coupled to a valve to turn fluid flow on and off based on fluid level. As well as being noisy, a large amount of force is often required to turn the inlet valve on and off. As a result, floats tend to be large and can occupy a significant amount of space in the reservoir. An example of this design is the traditional piston and ballcock design which has a relatively large float positioned on the end of a relatively long lever arm.

Accordingly, a need exists to provide an inlet valve which offers a high flowrate at low pressures as often provided by piston valves, and low activation force requirements as often provided by pilot valves. Further, in order to reduce total lifetime costs to the owner, there is a need for a flushing system that is easy to install and maintain. Moreover, there is also a need to include a short activation stroke for ADA compliance or limited power consumption if using fixed power sources such as battery power.

SUMMARY

Some embodiments include a fluid control system comprising an outlet valve assembly, an inlet valve assembly including a venturi inlet valve, and an actuator coupled to the inlet valve assembly. In some embodiments, the actuator is configured to enable a user to control and adjust a flush volume of fluid control system. Some embodiments include a moveable float positioned in a chamber of the outlet valve assembly, where the chamber includes a variably-sized upper portion, and where the volume of the upper portion is based at least in part on a variable position of the moveable float in the chamber. Some embodiments include a adjustable first control valve coupled to an outer surface of the outlet valve assembly, where the first control valve fluidly coupled to the inlet valve assembly. Some embodiments include an adjustable second control valve movably coupled to an outer surface of the outlet valve assembly, where the second control valve is fluidly coupled to the inlet valve assembly. Some embodiments also include a bellows positioned in and coupled to the variably-sized upper portion. In some embodiments, the bellows are fluidly coupled to the venturi inlet valve and at least one of the first and the second control valves.

Some embodiments include a first control valve that comprises an inverted cup coupled to a channel that is fluidly coupled to the inlet valve assembly, where based on a position of the first control valve on an outer surface of the outlet valve, the first control valve is configured and arranged control access of at least a portion of the inlet valve assembly to an open atmosphere based at least in part on an initial fluid level of fluid in a reservoir in which the fluid control system is at least partially positioned.

In some further embodiments of the invention, a second control valve comprises an inverted cup coupled to a channel that is fluidly coupled to the inlet valve assembly, where based on a position of the second control valve on an outer surface of the outlet valve, the second control valve is configured and arranged control access of at least a portion of the inlet valve assembly to an open atmosphere based at least in part on a residual fluid level of fluid in a reservoir in which the fluid control system is at least partially positioned.

Some embodiments comprise a supply line coupled to the inlet valve assembly, where the supply line is configured to be coupled to a fluid supply configured to route outside of a fluid reservoir or at least partially route inside a fluid reservoir. In some embodiments, the actuator comprises a push-button activation enabling opening and closing of one or more valves or vents to enable a controlled flush.

In some embodiments, the inlet valve assembly comprises valve bellows configured to expand as a result of user-activation of the actuator. In some embodiments, the valve bellows are configured to actuate an inlet valve to enable fluid to flow in a fluid path from a fluid supply line.

Some embodiments are configured and arranged for the fluid path to include the fluid passing through the venturi inlet valve before entering portions of the outlet valve. In some embodiments, the expansion of the valve bellows is configured to push a pivoted lever that in turn activates a valve. In some embodiments, the valve comprises a poppet valve. In some embodiments, activation of the valve enables a reduction in atmospheric pressure of the upper portion the outlet valve enclosed by the upper housing.

In some embodiments of the invention, a flow of fluid through the venturi inlet valve induces at least a partial vacuum in the bellows, and the variable position of the moveable float is based at least in part on at least one of an atmospheric pressure in the bellows and a fluid pressure force on the moveable float. In some embodiments, at least a partial vacuum created in the bellows by a fluid flow through the venturi inlet valve from a supply line enables the moveable float to lift to a least partially cover an input port to the outlet valve resulting in a slowing or stopping of the fluid flow from the supply line. In some other embodiments, the inlet valve assembly is configured and arranged to be removably coupled to the outlet valve.

Some embodiments include a fluid controller comprising an actuator coupled to a fluid inlet valve assembly, and a fluid supply line coupled to the fluid inlet valve assembly. Some embodiments include an outlet valve assembly removably coupled to the fluid inlet valve assembly. In some embodiments, a float is positioned at least partially in an inner housing of the outlet valve assembly, and the inner housing at least partially encloses a variably-sized chamber, where a position or movement of the float in the variably-sized chamber is based at least in part on an atmospheric pressure or changing atmospheric pressure in a bellows coupled to the float. Further, the volume of the variably-sized chamber is based at least in part on the position of the moveable float in the chamber.

Some embodiments include a first supply aperture positioned on an outer surface of the outlet valve assembly, where the first supply aperture is adjustably coupled to a first channel, and where the first channel is fluidly coupled to the fluid inlet valve assembly. Further, some embodiments include a second supply aperture positioned on an outer surface of the outlet valve assembly, where the second supply aperture is adjustably coupled to a second channel, and where the second channel fluidly coupled to the fluid inlet valve assembly.

Some embodiments include a venturi inlet valve of the fluid input valve, where the bellows are configured to be fluidly coupled to the venturi inlet valve, and where the venturi inlet valve is configured and arranged to enable fluid flow into portions of the outlet valve assembly. In some further embodiments, the fluid inlet valve assembly and outlet valve assembly are configured and arranged so that any fluid passing through the venturi inlet valve reduces atmospheric pressure in the bellows. In some embodiments, the bellows is fluidly coupled to the venturi inlet valve, and at least one of the first and the second supply apertures.

In some embodiments, based at least in part on the position of at least one of the first supply aperture and/or the second supply aperture, and/or a state of immersion of the first supply aperture and/or the second supply aperture in a fluid of a tank or reservoir, an access of at least a portion of the inlet valve assembly to an open atmosphere can be modified, partially closed or completely closed. In some other embodiments, partial or full closure of access of at least a portion of the inlet valve assembly to an open atmosphere can reduce or prevent fluid from flowing from the fluid supply line into the outlet valve assembly.

DESCRIPTION OF THE DRAWINGS

FIG. 8 illustrates a flush and inlet valve assembly with an initial fluid level in accordance with some embodiments of the invention.

DETAILED DESCRIPTION

Figure 1:
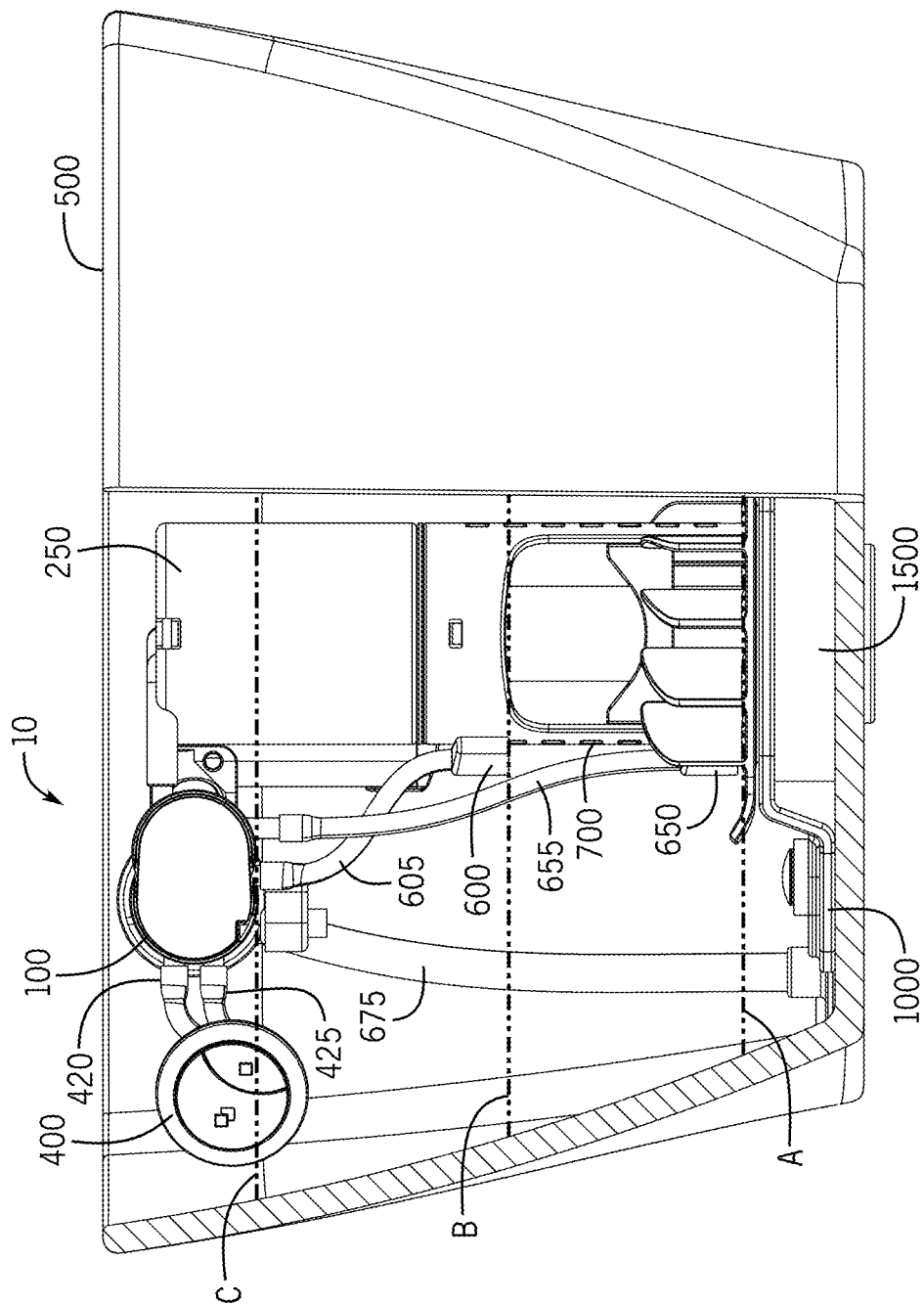
FIG. 1 illustrates a partial cutaway front view of a fluid reservoir with an installed flush and inlet valve assembly in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," "in communication with," and "coupled" and variations thereof are used broadly and encompass integrated, integral with and both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Some embodiments relate to a system for controllably supplying fluid to a reservoir. Some embodiments include systems and method for controlling fluid flow and fluid level in a reservoir so that the flow of fluid through the fluidic system and into the reservoir provides a controllable source of energy to control the operation of valves of the system. In some embodiments, the energy can be utilized to control a reservoir inlet valve and/or a reservoir outlet valve (e.g., such as a flush valve). Other embodiments include one or more alternative and/or additional other devices or systems, e.g. impeller, electrical generator, piston, etc.

Some embodiments include a flush and inlet valve assembly that can be operated by a user to enable a controlled fluid flush (from a reservoir or tank) and/or a controlled fluid fill (to a reservoir or tank) without a requirement for application of significant mechanical force, movement, and/or effort by the user. For example, some embodiments include a push-button activation for opening and closing one or more valves and/or vents to enable a controlled fluid transfer (e.g., a controlled fluid flush or controlled fluid fill). In some embodiments, the duration of the flush and/or the total volume of fluid of the flush can be controlled using a push-button or other switch, lever, toggle, or other conventional activator method. In some embodiments, the functions of the flush and inlet valve assembly can be activated by a one-time activation of the push-button or switch/activator. In some further embodiments, the push-button, switch or activator can activate a flush and/or fill using a one-time activation regardless of the user contact time or force on the push-button or other switch or activator.

In some embodiments, any of the assemblies described herein can be modular. For example, some embodiments include a connection or combination of hydraulic subsystems, e.g. activation, reservoir inlet valve, reservoir outlet valve, waste fluid, etc. In some embodiments, coupling or connection can be manual, intuitive, and with "no tools required", e.g. using techniques such as a snap, click, slide, insert, twist, push, pull, and other known techniques.

FIG. 1 illustrates a partial cutaway front view of a fluid reservoir 500 with an installed flush and inlet valve assembly 10 in accordance with some embodiments of the invention. As shown, some embodiments include an outlet valve assembly 250 coupled to an inlet valve assembly 100 mounted an cleat 1000 and secured to the base 505 of the tank or cistern 500 (see for example FIG. 16 for further details). In some embodiments, the inlet valve assembly 100 can be controllably and/or fluidly coupled to an actuator configured for a user to control a flush volume of the flush and inlet valve assembly 10. In some embodiments, the inlet valve assembly 100 can include a half flush and/or a full flush connection fluidly coupled to an actuator 400 and configured for a user to control a flush volume. For example, some embodiments include an actuator 400 (e.g., a dual flush actuator) that is configured to enable a user to control a flush volume of the flush and inlet valve assembly 10. In some embodiments, the actuator 400 can comprise touchless, button, lever, toggle, or other actuation means, or combinations thereof. Any user-operated actuator, switch or toggle can be implemented as the actuator 400. For example, in some embodiments, the inlet valve assembly 100 can include a full flush connection line 420 and/or a half flush connection line 425 coupled to a pneumatic actuator 400 (e.g., a dual flush actuator) that is configured to enable a user to control a flush volume of the flush and inlet valve assembly 10. In some embodiments, the actuator 400 can comprise touchless, button, lever, toggle, or other actuation means, or combinations thereof fluidly coupled to the connection lines 420, 425. The non-limiting embodiments of the connection lines 420, 425, and actuator 400 can be seen in further detail in FIGS. 7 and 8 which also shows supply line 675.

In some embodiments, the flush and inlet valve assembly 10 can include widely adjustable fluid levels, including, but not limited to, an initial fill level, and/or a half flush residual fluid level, and/or a full flush residual fluid level. For example, in some embodiments, the flush and inlet valve assembly 10 can include adjustable flush levels as depicted in FIG. 1, including, but not limited to, initial fill level (marked as "C"), and/or a half flush residual fluid level (marked as "B"), and/or a full flush residual fluid level (marked as "A"). In some embodiments, the supply line 675 can be coupled to the inlet valve assembly 100 from a fluid supply. However, the fluid supply need not be limited to being extended through a tank or reservoir. In some embodiments, the fluid supply source may route around the outside of the tank or reservoir, and/or can be located completely outside the tank or reservoir (see also FIG. 19 and associated description below related to fluid supply and supply line 675 embodiments).

Figure 2:
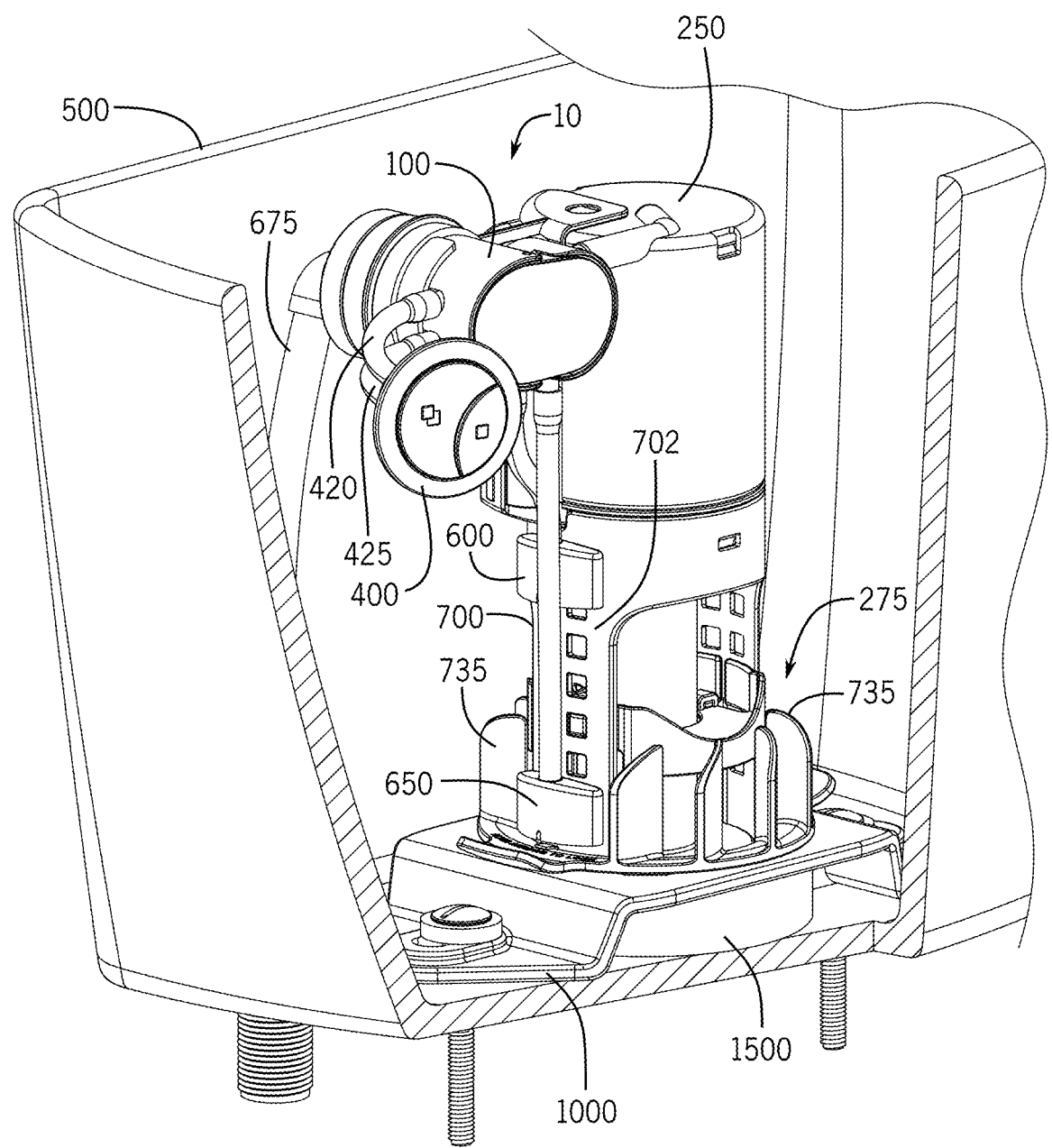
FIG. 2 illustrates a partial cutaway side perspective view of a fluid reservoir with an installed flush and inlet valve assembly in accordance with some embodiments of the invention.
Figure 3:
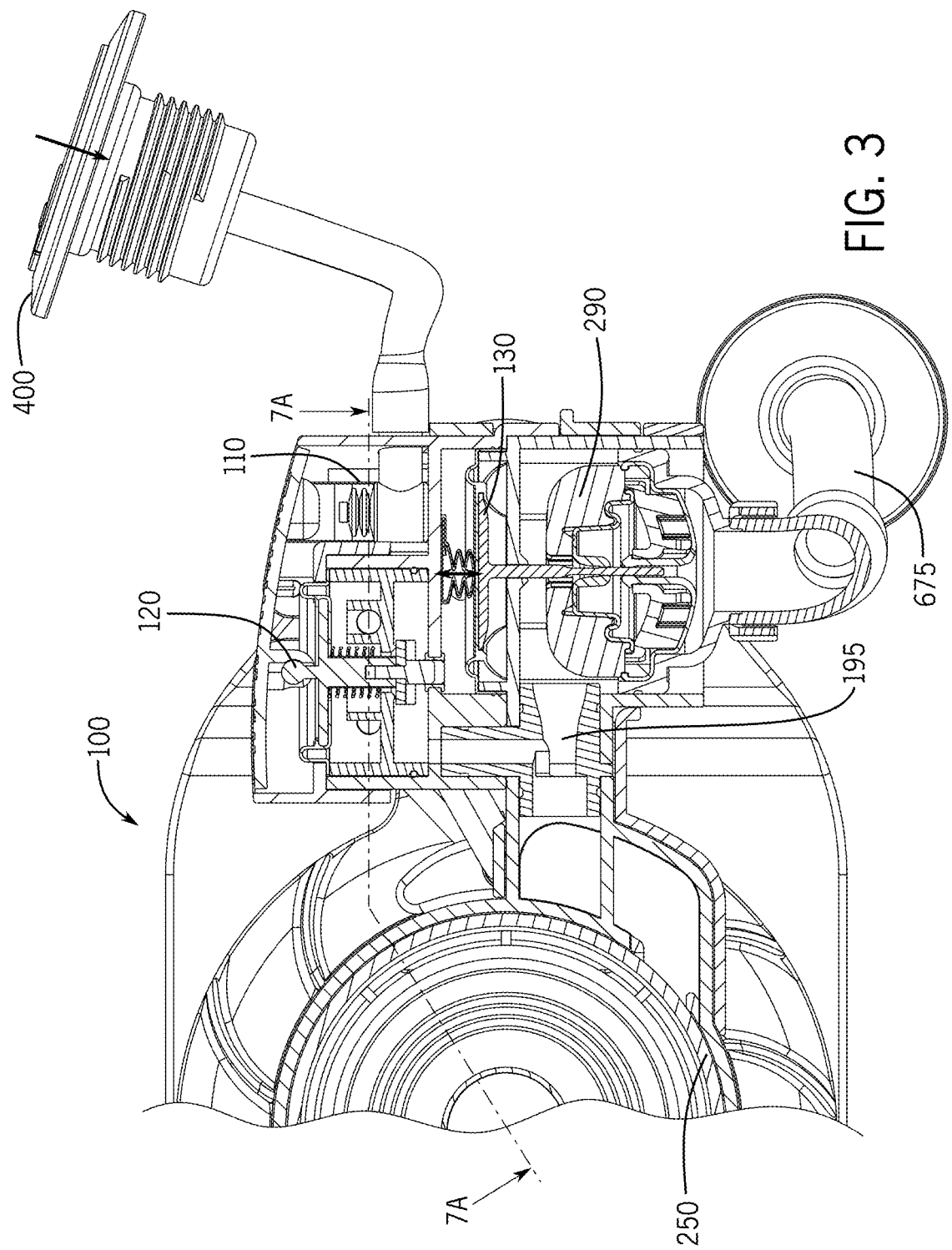
FIG. 3 illustrates a partial cross-sectional view of an inlet valve assembly in accordance with some embodiments of the invention.
Figure 4:
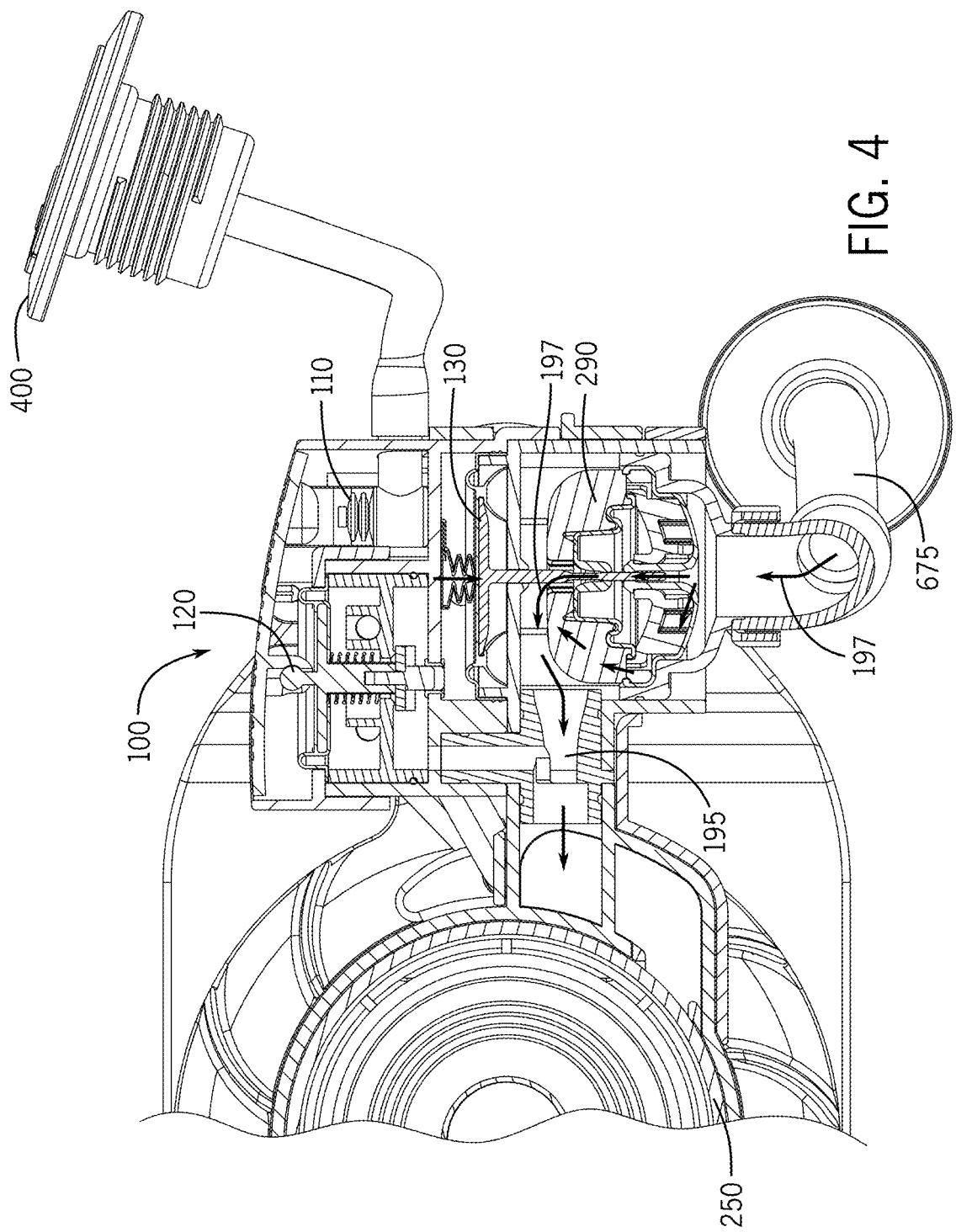
FIG. 4 illustrates a partial cross-sectional view showing a fluid inlet and path of flow through the inlet valve assembly 100 in accordance with some embodiments of the invention.

Some embodiments of the invention include one or more apertures, vents, or valves for sensing and/or providing control over one or more fluid handling or controlling characteristics of the flush and inlet valve assembly 10. As shown in FIG. 1, and further shown in more detail in at least FIG. 2, showing a partial cutaway side perspective view of a fluid reservoir 500 with an installed flush and inlet valve assembly 10, some embodiments include one or more supply apertures and/or control valves fluidly coupled to the inlet valve assembly. When coupled to a supply of fluid, the flow of fluid from a supply line 675 through the flush and inlet valve assembly 100 can include passage of fluid into the inlet valve assembly 100 where one or more portions of the inlet valve assembly 100 can control the flow. FIG. 3 illustrates a partial cross-sectional view of an inlet valve assembly 100 in accordance with some embodiments of the invention, and FIG. 4 illustrates a partial cross-sectional view showing a fluid inlet and path of flow through the inlet valve assembly 100 in accordance with some embodiments of the invention. In some embodiments, the outlet valve assembly 250 that can be coupled, mounted, or integrated to an inlet valve assembly 100 as shown. In some other embodiments, the outlet valve assembly 250 can be permanently coupled to the inlet valve assembly 100, or the inlet valve assembly 100 can be integrated with the outlet valve assembly 250.

FIGS. 3-14A-14F include illustrations and descriptions of one or more operational states of the flush and inlet valve assembly 10. FIG. 3 illustrates a partial cross-sectional view of an inlet valve assembly 100 in accordance with some embodiments of the invention, and FIG. 4 illustrates a partial cross-sectional view showing a fluid inlet and path of flow into the flush and inlet valve assembly in accordance with some embodiments of the invention. As shown, the inlet valve assembly 100 can comprise an assembly of flow channels and valves including bellows 110 fluidly coupled to actuator 400, poppet valve 119 with poppet 120, and valve with stem 130. In some embodiments, a user can operate the actuator 400 (as depicted by the arrow), that in turn can cause expansion of the bellows. In some embodiments, the initial process can initiate flow of fluid into a fluid tank (e.g., such as fluid reservoir 500). In some embodiments, as the bellows expand they can actuate an inlet valve and enable fluid to flow from supply line 675 through the inlet valve assembly 100 as shown by fluid path 197 in FIG. 4. As shown, the fluid path 197 includes passing through a venturi 195 before entering portions of the outlet valve assembly 250. In some embodiments, the action of the fluid passing through venturi 195 can cause air or other fluid to be drawn into the fluid path 197 from any fluid source including any other fluid lines, gaps, cavities, apertures, or combinations thereof. As a result, as air or other fluid is drawn into the fluid path 197, a vacuum or partial vacuum can be created within any region of the source of air or fluid (e.g., any fluid lines, gaps, cavities, apertures, or combinations thereof acting as a source of the air or fluid). In some embodiments, in any of the flush assemblies described herein, power can be harvested from the vacuum generated by fluid passing through the venturi, where the vacuum can be captured in one or more chambers, channels, fluid lines, bellows, or other cavities couple to the venture 195. Moreover, in some embodiments, the venturi 195 can be coupled to moving fluid in an inlet, a flush circuit, or any other conduit or component containing or coupled to a static or moving fluid.

In some embodiments, a vacuum or partial vacuum created in one or more of the chambers, channels, and/or cavities can be used to affect one or more downstream actions, e.g. opening and closing a valve, operating a generator, producing a siphon, etc. In some embodiments, the bias of vacuum can be directed via switching logic such as a mechanical state machine, electrical logic control, a direct user interface (e.g. a button, pin, rocker, toggle, bellows, etc.) or an external interface (e.g. solenoid, actuator, air pulse, etc.) In some embodiments, the negative pressure or vacuum or partial vacuum can comprise potential energy (i.e., a form of energy that has stored potential that can be put to future use). In this instance, any space enclosing the vacuum or partial vacuum (e.g., the aforementioned fluid lines, gaps, cavities, apertures, or combinations thereof) is a form of potential energy that can be tapped for future use or operation of the flush and inlet valve assembly 10. In this way, the negative pressure can function similar to a capacitor, storing energy for future use. Further, in some embodiments, the action of the vacuum or partial vacuum induced or created by the venture 195 can comprise power that can be used to actuate or control various components or aspects of the flush and inlet valve assembly 10. For example, when valves or flow paths are open or opened, the pressure gradient caused by the venturi 195 can cause air or other fluid to flow. Further, any movable structure including one or more opposing sides with at least a portion of one side coupled to the vacuum or partial vacuum and at least a portion of the other side coupled to air or fluid at a different pressure (e.g., such as ambient atmosphere) can be induced to move due to the pressure differential.

In some embodiments, any of the assemblies described herein can be actuated via directing venture-induced vacuum to or venting the vacuum in one or more fluid control chamber(s). In some embodiments, the vents or apertures can be positioned at the fluid reservoir 500 fluid elevation where valve action is desired. In some embodiments, the vents can be configured and arranged as fluid level "sensors". For example, some embodiments include sensor, actuators, and/or fluid control valves that function to control fluid flow and/or pressure in portions of the inlet valve assembly and/or outlet valve assembly. For example, in some embodiments, supply line 675 can be coupled to the inlet valve assembly 100 from a supply extending through the fluid tank or cistern (e.g., such as from the base of fluid tank or cistern). Some embodiments include one or more sensors, actuators, and/or fluid control valves that function to control fluid flow and/or pressure in portions of the inlet valve assembly 100 and/or outlet valve assembly 250. For example, some embodiments include an initial or half-flush vent or aperture (controlling the lower fluid level of a completed half-flush or an initial fluid level) and/or a full-flush vent or aperture (controlling the fluid level of a completed full-flush or a residual fluid level).

In some embodiments, the supply aperture and/or control valve can comprise a structure of an inverted cup. For example, some embodiments include a half-flush inverted cup 600 coupled to an outer surface of the outlet valve assembly 250 and fluidly coupled to the inlet valve assembly 100. In some embodiments, the half-flush inverted cup 600 can control the lower fluid level of a completed half-flush). Further, some embodiments include a full-flush inverted cup 650 coupled to an outer surface of the outlet valve assembly 250. In some embodiments, the full-flush inverted cup 650 can control the fluid level of a completed full-flush. Some embodiments include one or more fluid flow lines coupling any sensors, actuators, and/or fluid control valves and the inlet valve assembly 100 and/or outlet valve assembly 250. For example, some embodiments include a fluid flow line 605 from the half-flush inverted cup 600 and/or a fluid flow line 655 from the full-flush inverted cup 655. In some embodiments, the fluid flow line 605 and/or the fluid flow line 655 can enable flow of air or other fluid to and from the cups 600, 650.

In some embodiments, either of the vents or apertures (and any coupled fluid lines) can be positioned or repositioned on the flush and inlet valve assembly 10 so as to change their immersion depth in a fluid tank or cistern and to affect or set a specific flush volume. For example, in some embodiments, the vents or apertures can be variably positioned. In some embodiments, a structure of the assembly 10 can include a plurality of extensions, apertures, or other conventional features or components to facilitate mounting and/or positioning of the vents or apertures. Further, some embodiments include one or more moveable or adjustable fluid flow lines coupling the sensor, actuators, and/or fluid control valves and the inlet valve assembly 100 and/or outlet valve assembly 250.

In some embodiments, the half-flush inverted cup 600 and/or the full-flush inverted cup 650 can be positioned or repositioned on the flush and inlet valve assembly 10 so as to change their immersion depth in a fluid tank or cistern and to affect and/or set a specific flush volume of a tank, reservoir or cistern. For example, as depicted in at least FIG. 2, in some embodiments, cups 600, 650 can be variably positioned on mounting leg 700. In some embodiments, mounting leg 700 can include a plurality of apertures or extensions 702 to facilitate mounting and/or positioning of the cups 600, 650.

In some embodiments, the outlet valve assembly 250 can include one or more structures to modify or guide fluid. For example, some embodiments include one or more guides 735. Some embodiments include a plurality of guides 735 extending at least partially around the outer circumference of a base 275 of the outlet valve assembly 250. In some embodiments, the guides 735 can guide or channel fluid in one or more preferred directions. In some embodiments, guides 735 are positioned adjacent cup 650. In some embodiments, cup 650 is positioned between guides 735.

Figure 5:
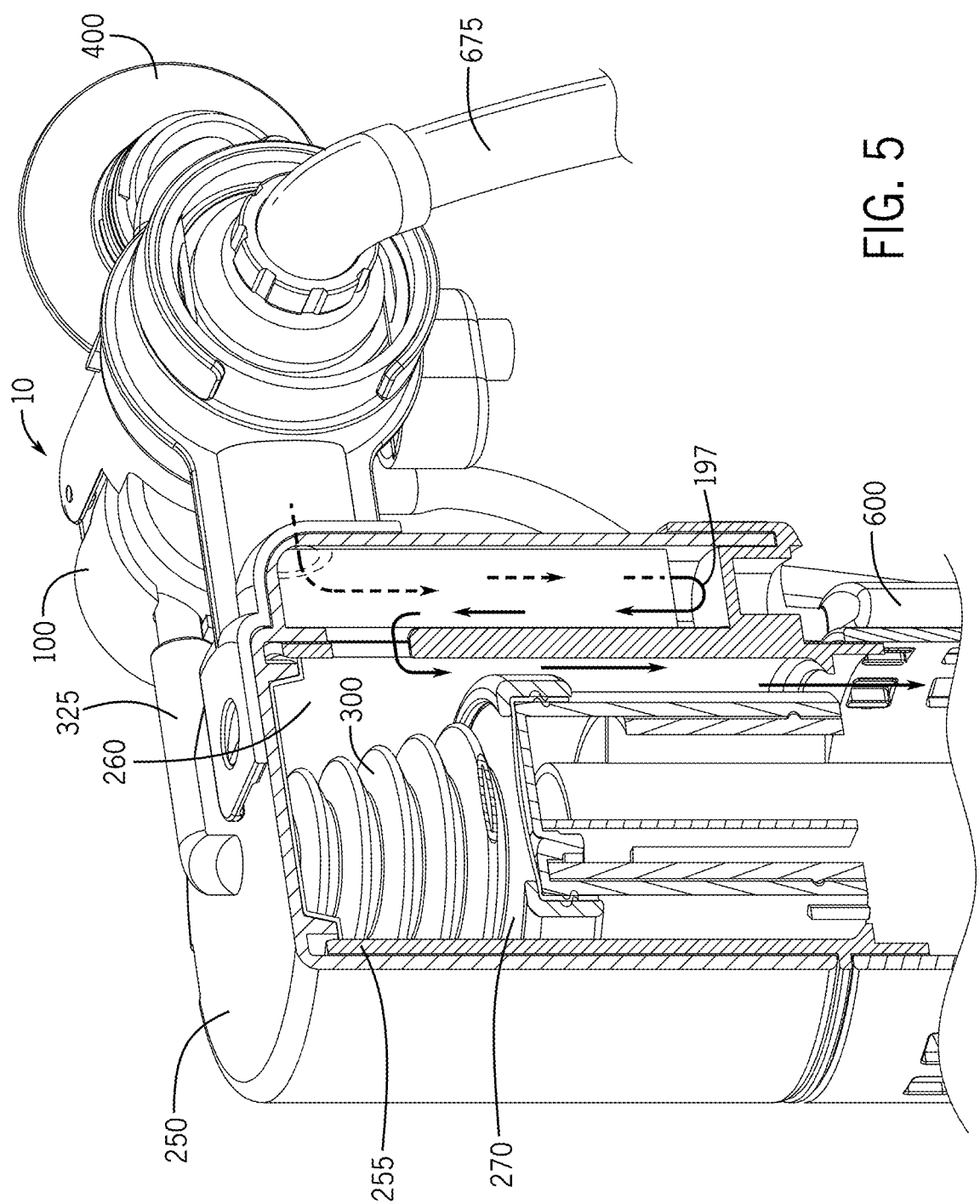
FIG. 5 illustrates a partial cross-sectional view showing a fluid inlet and tank fill flow path of the flush and inlet valve assembly in accordance with some embodiments of the invention.

FIG. 5 illustrates a partial cross-sectional view showing a fluid inlet and tank fill flow path of the flush and inlet valve assembly in accordance with some embodiments of the invention. The flow path 197 is shown entering portions of the outlet valve assembly 250 to fill a tank our reservoir in which the assembly 10 is mounted. The flow path 197 can continue in a serpentine path around the bottom wall of the float and in and around the float shaft to enter the tank. In this non-limiting embodiment, the outlet valve assembly 250 can comprise an upper housing 255 at least partially enclosing an outlet valve chamber 260, and a variable position float 270 that can be positioned in at least a portion of the chamber 260. In some embodiments, during a fill and/or flush action, fluid (e.g., such as water, grey water, water/air mixtures, effluent water, drinking water, flushing solution, etc.) can flow from the supply line 675, through portions of the inlet valve assembly 100 and through a venturi 195. FIG. 5 shows the fluid flow lines marked by arrows. The fluid is shown exiting the upper housing 250 and would therefore enter a fluid tank or cistern when mounted as shown previously in FIG. 2. In some embodiments, the volume of the chamber 260 can change based on the position of the float 270. At least based on the float 270 being moveably positioned, the chamber 260 can vary in size. In some embodiments, bellows 300 can be positioned in and coupled to the float 270 as shown in FIG. 5. In some embodiments, the bellows can be mounted anywhere desired and can be fluidly coupled to the venturi 195 via channel 325.

Figure 6:
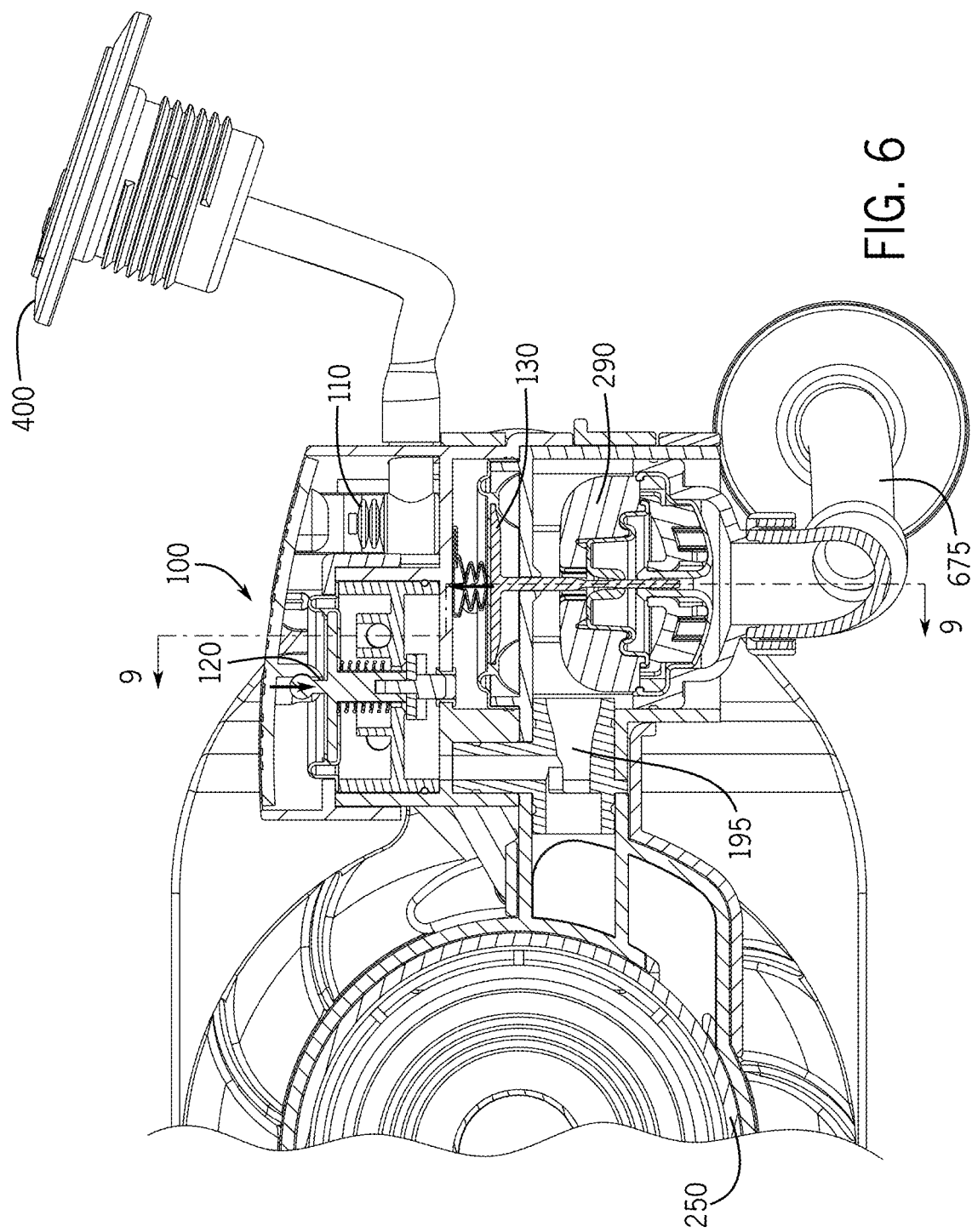
FIG. 6 illustrates an actuation and inlet valve operation in accordance with some embodiments of the invention.

As shown in FIGS. 4 and 6, the inlet valve assembly 100 can comprise an assembly of flow channels and valves including bellows 110 fluidly coupled to actuator 400, poppet valve 120, and valve with stem 130. In some embodiments, a user can operate the actuator 400 (as depicted by the arrow), and expansion of the bellows 110 can push a pivoted lever that in turn activates a poppet valve 120.

Figure 7:
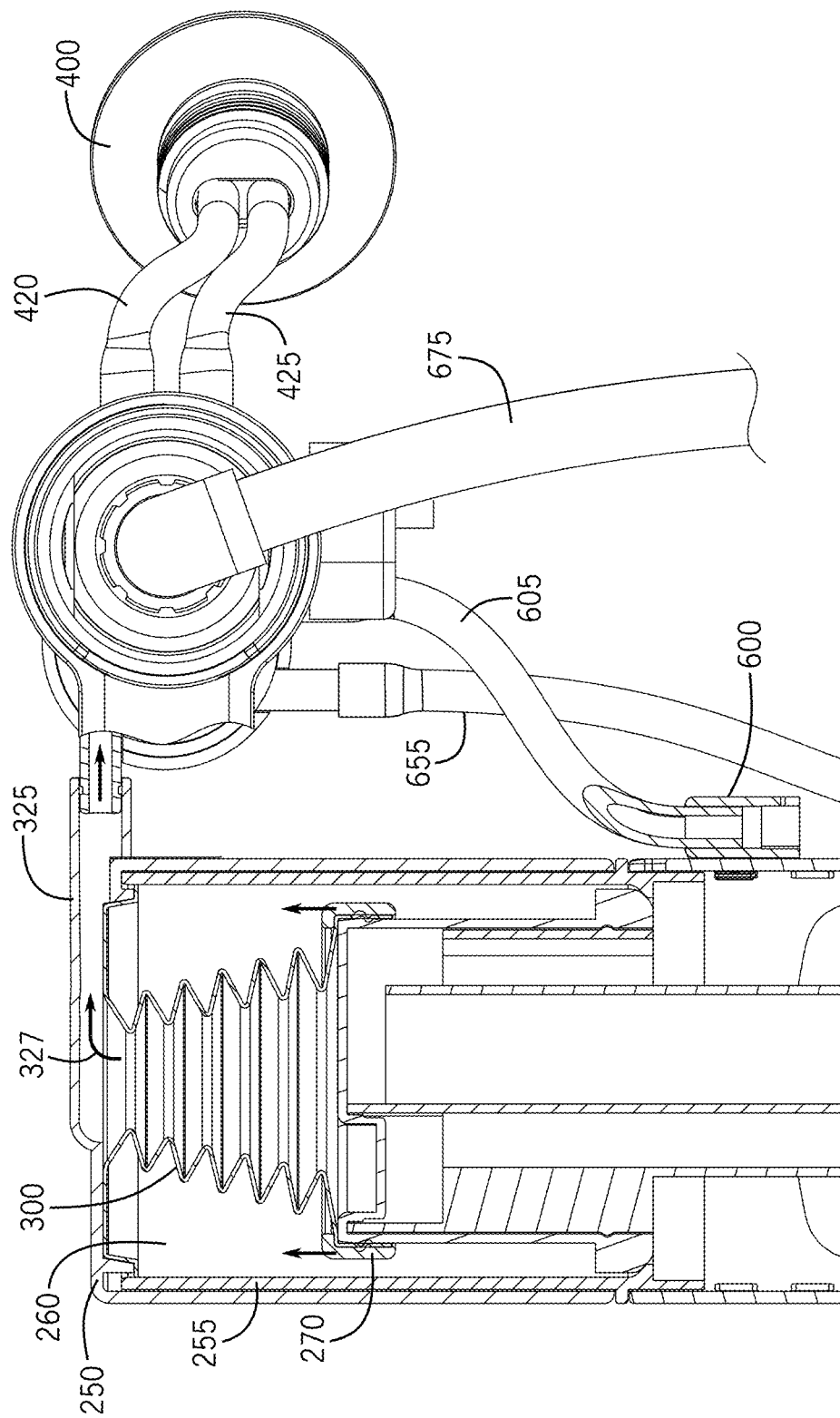
FIG. 7 illustrates a cross-sectional view of an inlet valve operation and fluid fill path in accordance with some embodiments of the invention in accordance with some embodiments of the invention.
Figure 7A:
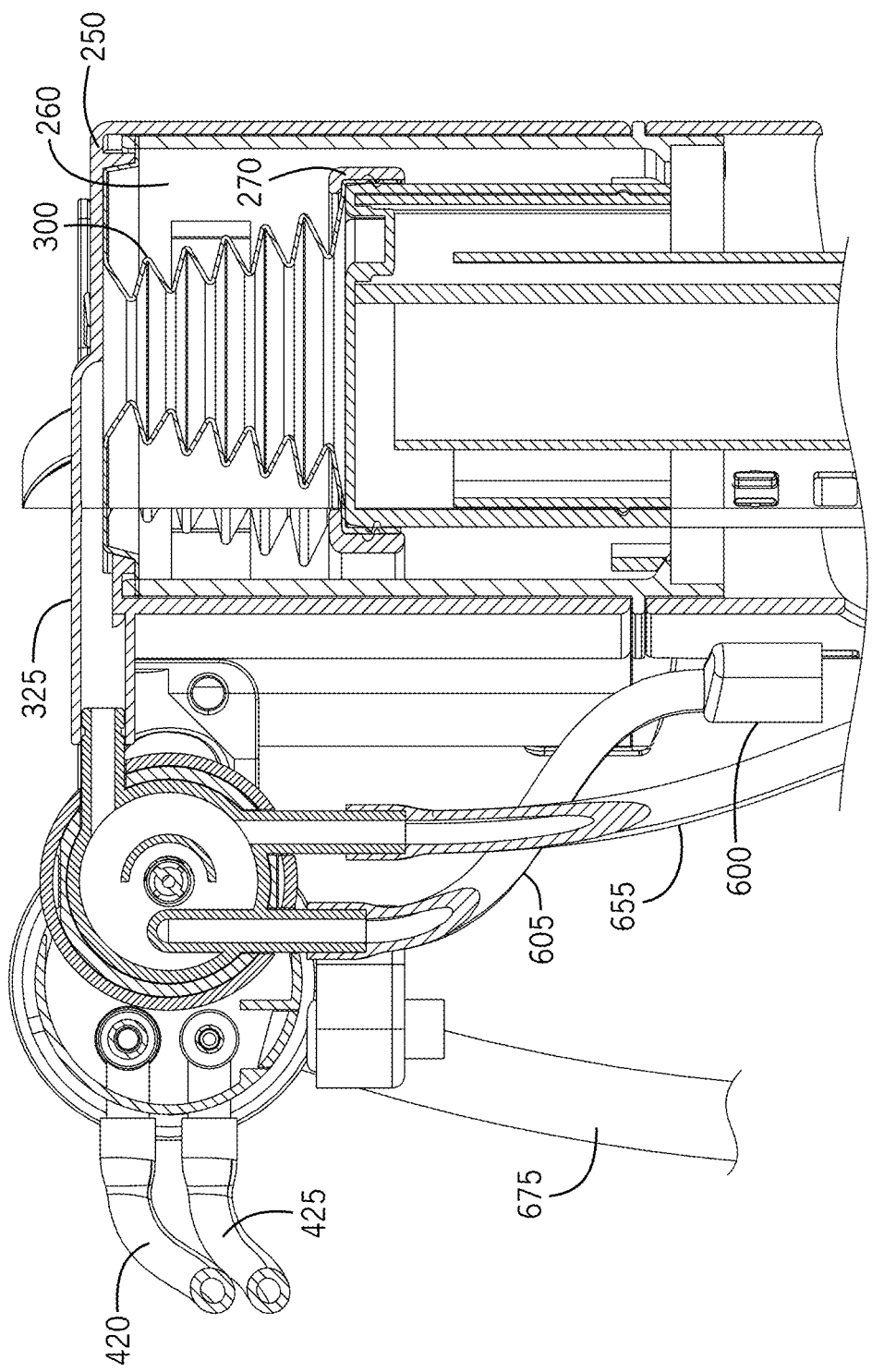
FIG. 7A illustrates a cross-sectional view of the bellows and channel extending to the outlet valve assembly in accordance with some embodiments of the invention.

FIG. 7 illustrates a cross-sectional view of an inlet valve operation and fluid fill path in accordance with some embodiments of the invention in accordance with some embodiments of the invention, and FIG. 7A illustrates a cross-sectional view of the bellows 300 and channel 325 extending to the outlet valve assembly 250 in accordance with some embodiments of the invention. As depicted, in some embodiments, the poppet valve 120 of flush and inlet valve assembly 10 can send suction to the bellows 300 enclosed by the upper housing 255, and a variable position float 270 positioned in at least a portion of the chamber 260 can rise causing a flush opening and a flush of the tank or reservoir 500. Thus, during a fluid flow condition, the venturi 195 can provide dual functions of control fluid flow into the tank for fill and flush, as well as powering a lift of the float 270 due to the negative pressure imparted by the fluid flow within the venture 195. The poppet valve 120 and other mechanisms described herein can be pressure balanced to enable easier actuation and/or movement.

Other embodiments of the flush and inlet valve assembly 10 can include more than one venturi type valve. Moreover, in some embodiments, the flush and inlet valve assembly 10 can include a venturi type valve coupled to an input flow or an output flow such as a flush flow. For example, in some embodiments, the outlet valve assembly 250 can include a venturi flow valve coupled and/or in line with the fluid exiting the assembly 10 and/or tank. In this instance, the kinetic energy from the fluid flow out of the tank (converted from potential energy of the fluid in the tank) can be harnessed and/or stored as vacuum or partial vacuum to provided power for one or more functions of the assembly 10 or a toilet system including the assembly 10.

Figure 9:
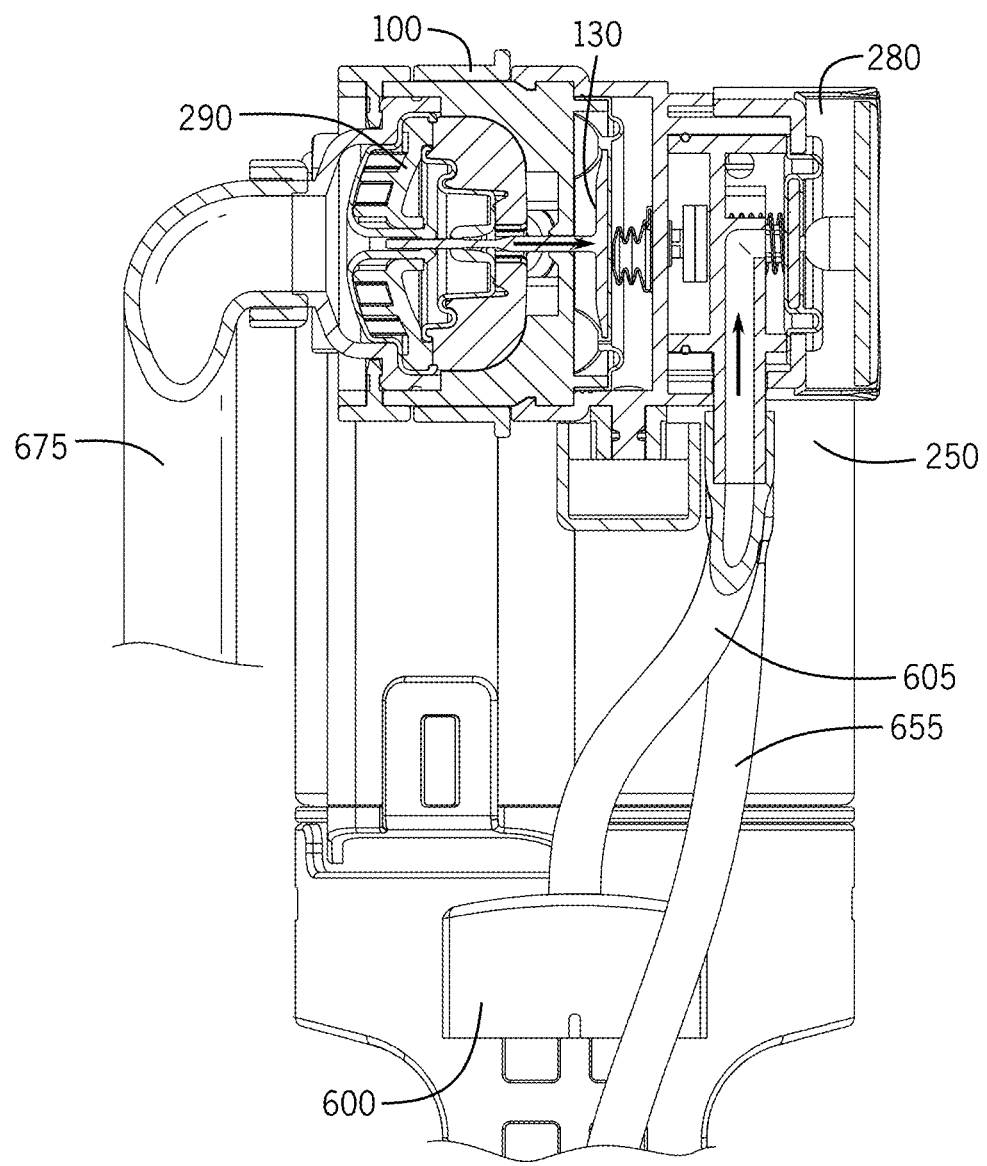
FIG. 9 illustrates a flush and inlet valve assembly inlet valve operation in accordance with some embodiments of the invention.

Some embodiments include features for adjustable flush volumes. For example, as described earlier, the flush and inlet valve assembly 10 can include an initial fluid level cup 600. FIG. 8 illustrates a flush and inlet valve assembly with an initial fluid level "C" in accordance with some embodiments of the invention. In some embodiments, the cup 600 can function to provide an initial fluid level adjustment. In some embodiments, the cup 600 can be positioned or repositioned on the flush and inlet valve assembly 10 so as to change immersion depth in a fluid tank or cistern and to affect or set a specific fluid level (and thus flush volume). Further, FIG. 9 illustrates a flush and inlet valve assembly 10 inlet valve assembly 100 operation in accordance with some embodiments of the invention. In some embodiments, when the fluid reaches the level of the initial level cup 600, chamber 280 is sealed from the open atmosphere. As the chamber 280 is fluidly coupled to suction from the venture 195, the diaphragm is pulled and the main valve 290 is closed.

Figure 10:
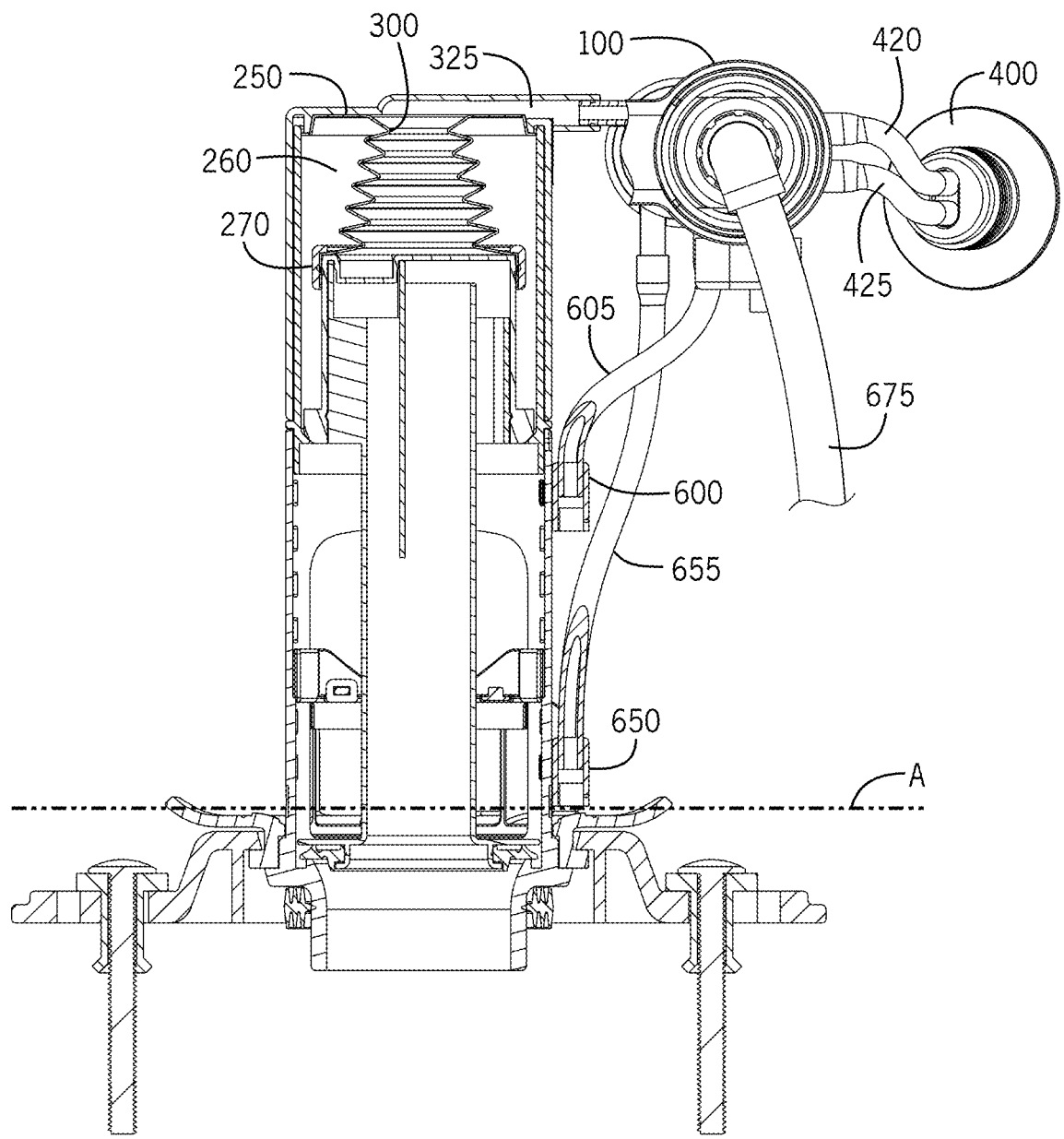
FIG. 10 illustrates a flush and inlet valve assembly with residual fluid level in accordance with some embodiments of the invention.
Figure 11:
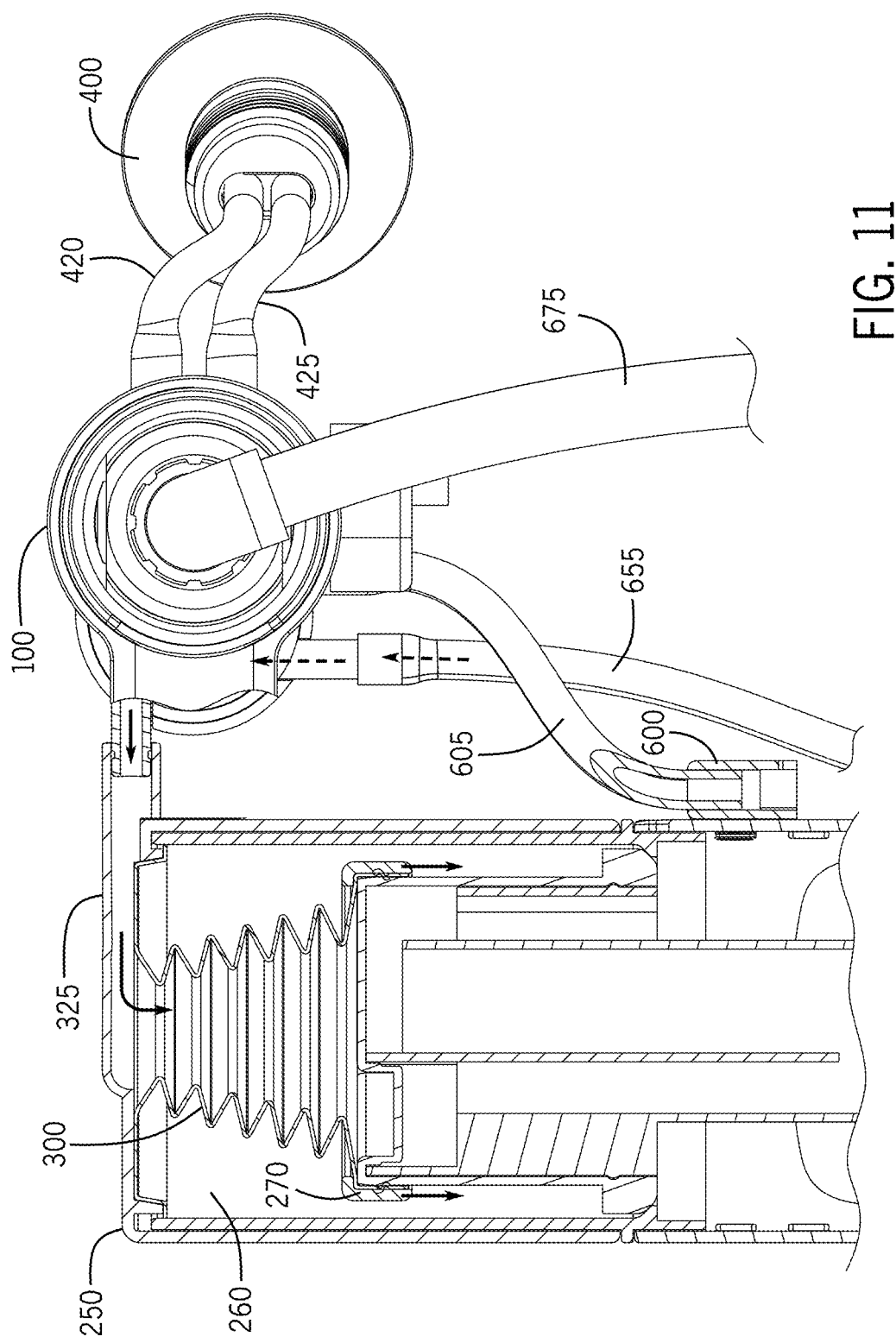
FIG. 11 illustrates a flush and inlet valve assembly inlet valve operation in accordance with some embodiments of the invention.

Similarly, a residual fluid level can be controlled. For example, in reference to FIG. 10, illustrating a flush and inlet valve assembly 10 with residual fluid level "A", in some embodiments, cup 650 can provide a residual fluid level adjustment. Further, referring to FIG. 11, illustrating a flush and inlet valve assembly 10 inlet valve operation, in some embodiments, when the tank 500 is emptying, and the fluid level reaches the cup 650 (shown in FIG. 10), the vacuum holding the float 270 up is broken, and the float 270 drops (noted by arrows). This action closes the flush cycle and allows fluid to refill the tank 500.

Figure 12:
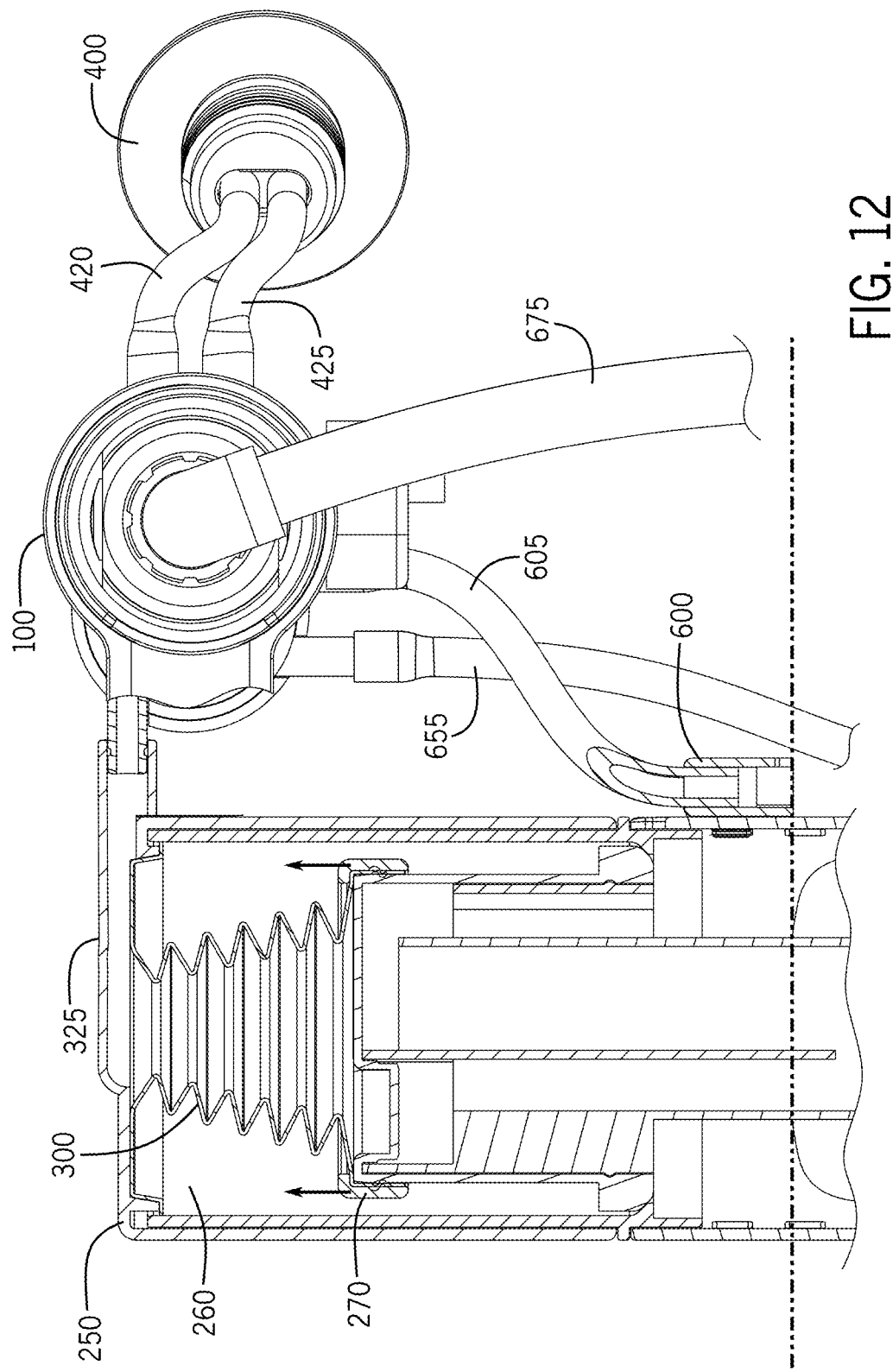
FIG. 12 illustrates a flush and inlet valve assembly inlet valve operation in accordance with some embodiments of the invention.
Figure 13:
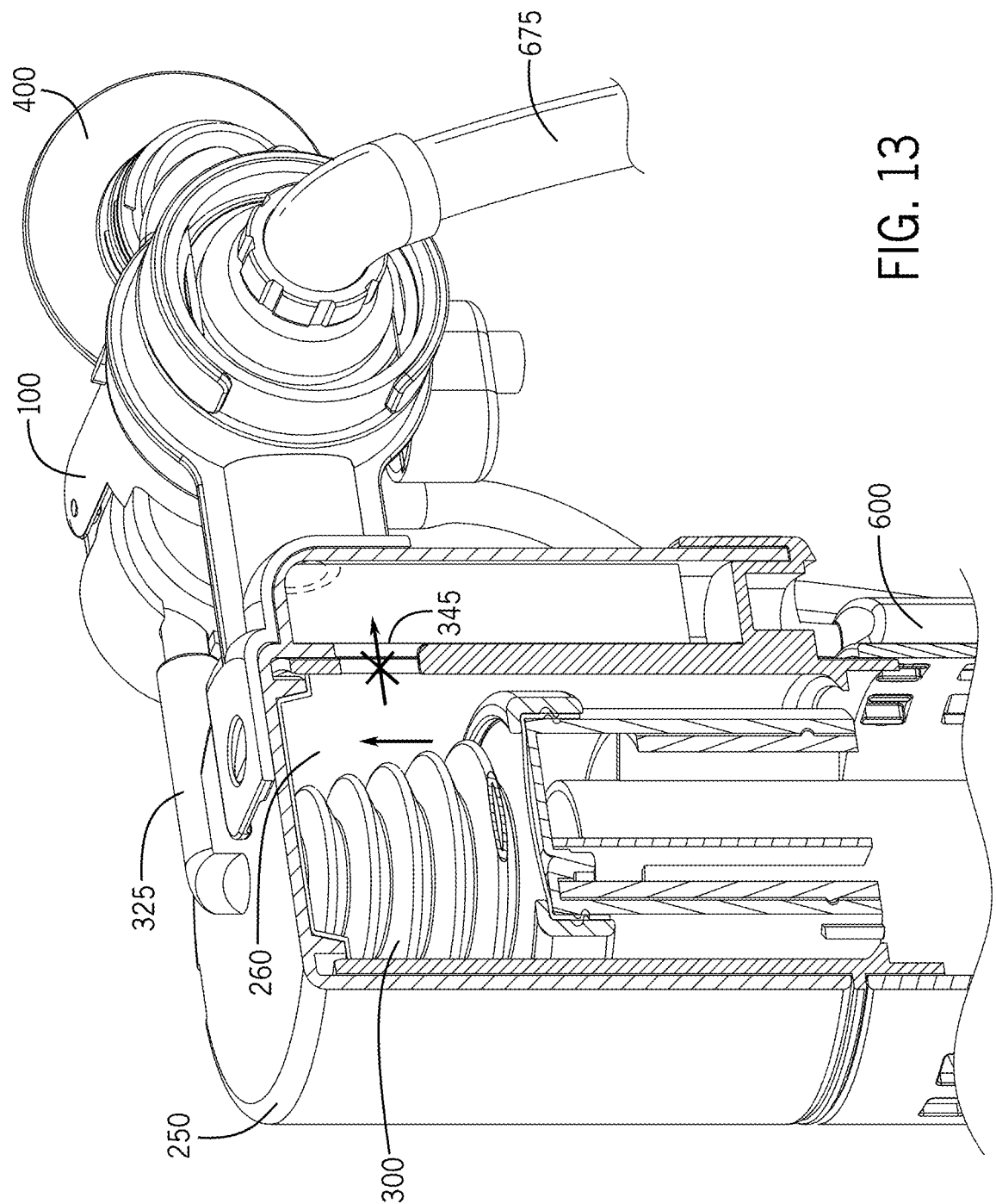
FIG. 13 illustrates a flush and inlet valve assembly inlet valve operation in accordance with some embodiments of the invention.

In some further embodiments, venturi induced vacuum can control incoming fluid. For example, in reference to FIG. 12, illustrating a flush and inlet valve assembly 10 inlet valve operation in accordance with some embodiments of the invention, and FIG. 13 illustrating a flush and inlet valve assembly inlet valve operation, in some embodiments, vacuum created in the bellows 300 by siphoning of supply lines can lift the float 270 (noted by arrows), which eventually can reach the input port 345 to the outlet valve assembly 250, and break the siphon.

Some embodiments include inherent overflow protection. Where an overflow can cause the float 270 to lift due to buoyancy, which in turn can cause opening of the outlet valve and subsequent emptying of the tank. In some other embodiments, the float shaft can be utilized to provide overflow protection. For example, some embodiments include a float shaft with an internal flow channel coupled to a flush exit of the tank. In some embodiments, an overfill of fluid can rise up and over the end of the float shaft and down through the center of the float shaft to a drain. Some embodiments also include a bowl refill slot in a sidewall to provide adjustable refilling of the bowl.

FIGS. 14A-14F illustrates a sequence of inlet valve assembly 100 operational states in accordance with some embodiments of the invention. Depending on the operational states, one or more channels, cavities, or other spaces in the inlet valve assembly 100 can be at atmospheric pressure, under vacuum or partial vacuum (shown as negative pressure). Further, in some embodiments, the inlet valve assembly 100 can include one or more fluid flows depending on the operational state, including fluid flow (e.g., such as a fluid flow) and/or an air flow. In some embodiments, one or more channels, cavities, or other spaces in the inlet valve assembly 100 can include one or more combined flows (e.g., such as water or other fluid and air mix). Locations of negative pressure (13a) and marked as a dotted box, air flow (13b) marked as dashed arrows, and fluid flow (13c) marked as dotted arrows are shown in one or more of FIGS. 14A-14F based on the operational state of the inlet valve assembly 100. Further, embodiments can include intermediary states where the locations of negative pressure (13*a*), air flow (13*b*), and/or fluid flow (13*c*) can be static (i.e., not changing significantly) or in a state of change or fluctuating, e.g., such as where the negative pressure (13*a*), air flow (13*b*), and/or fluid flow (13*c*) is increasing or decreasing.

Figure 14A:
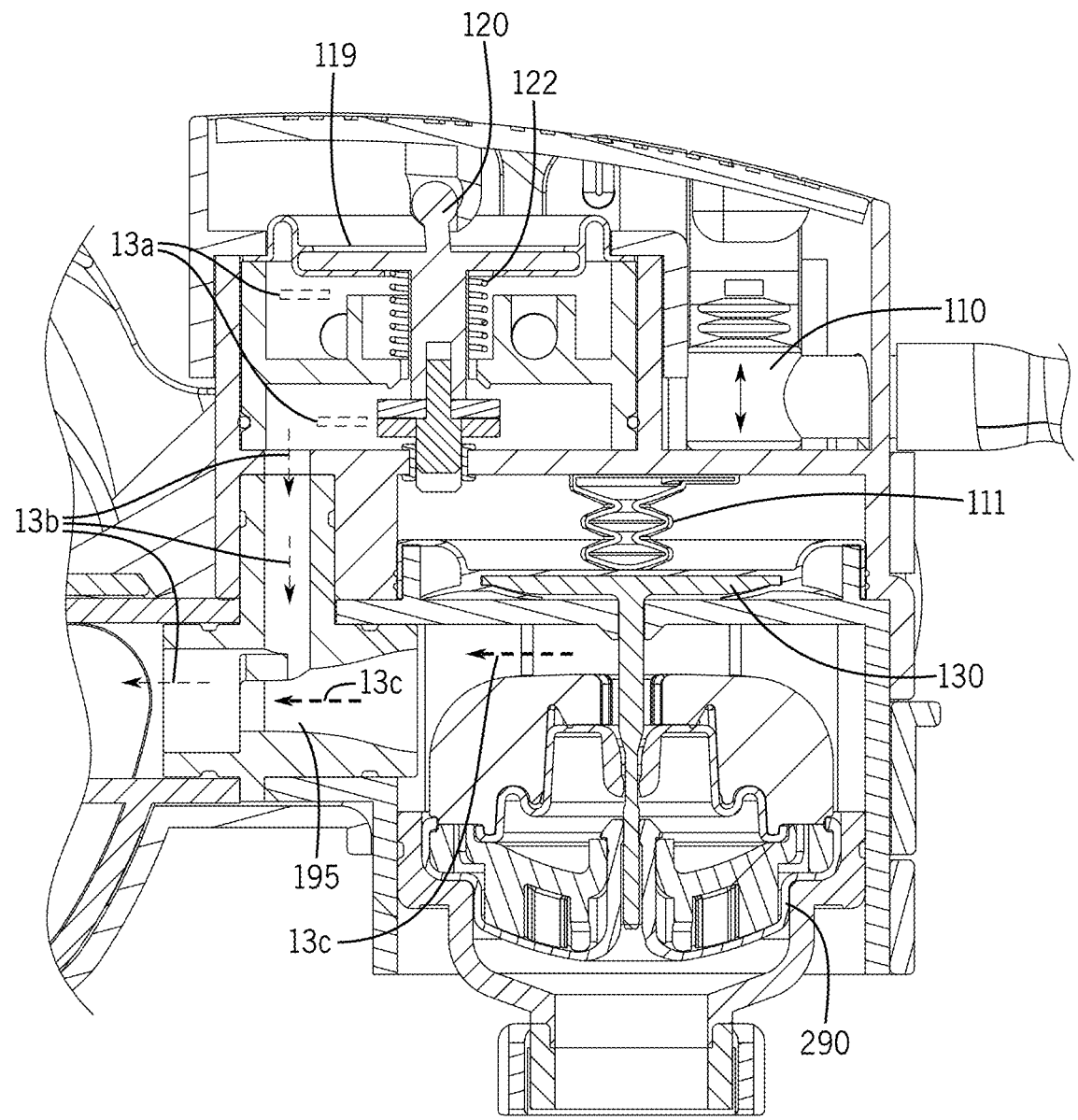
FIGS. 14A-14F illustrate a sequence of inlet valve operational states in accordance with some further embodiments of the invention.
Figure 14B:
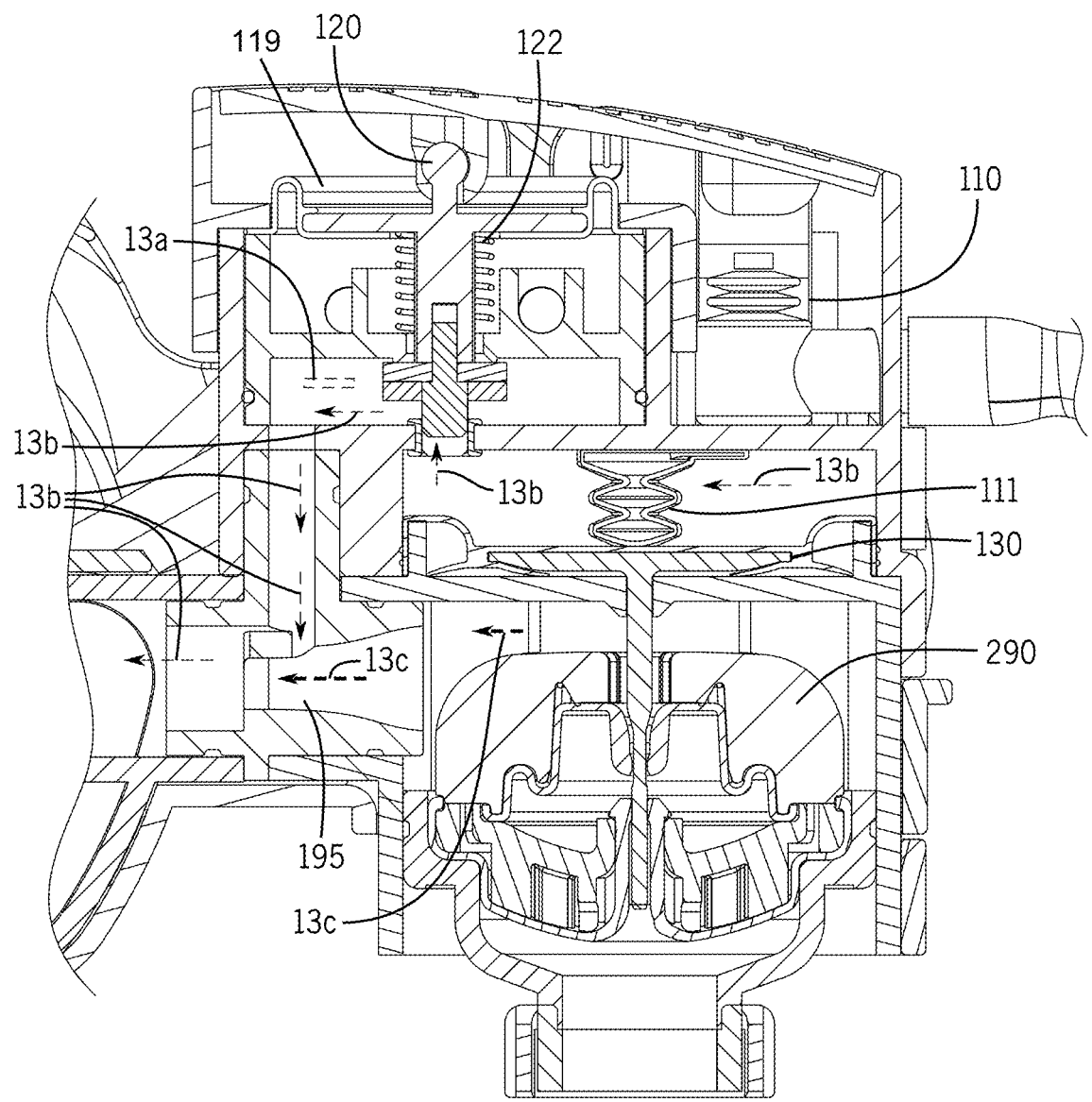

In reference to FIG. 14A showing a half-flush open stage 1 state of the inlet valve assembly 100, with the bellows 110, 111 expanded and fill vent open to atmospheric pressure, the valve stem 130 is pushed down and a fluid flow is maintained into the outlet valve assembly 250 through the venturi valve 195. Further, air is drawn towards the venturi valve 195 with negative pressure formed on either side of the poppet valve as the poppet 120 is pushed down. Turning to FIG. 14B, showing a half-flush close stage 2 state, with bellows 110 retracted, vacuum pressure is released when the fluid level is dropped to below the half flush vent tube (through cup 600) and the poppet valve 120 is popped up by the poppet spring 122. Air flow is drawn towards the venturi valve 195 with negative pressure formed on either side of the output side of the poppet valve as fluid flows through the venturi valve 195 into the outlet valve assembly 250. Some embodiments provide very low actuation pressures even with large diameter flush orifices, making the system readily useable by young and elderly users unlike many conventional designs. Some embodiments also provide binary flush characteristics which provide the same flush volumes regardless of how long a user actuates the system.

Figure 14C:
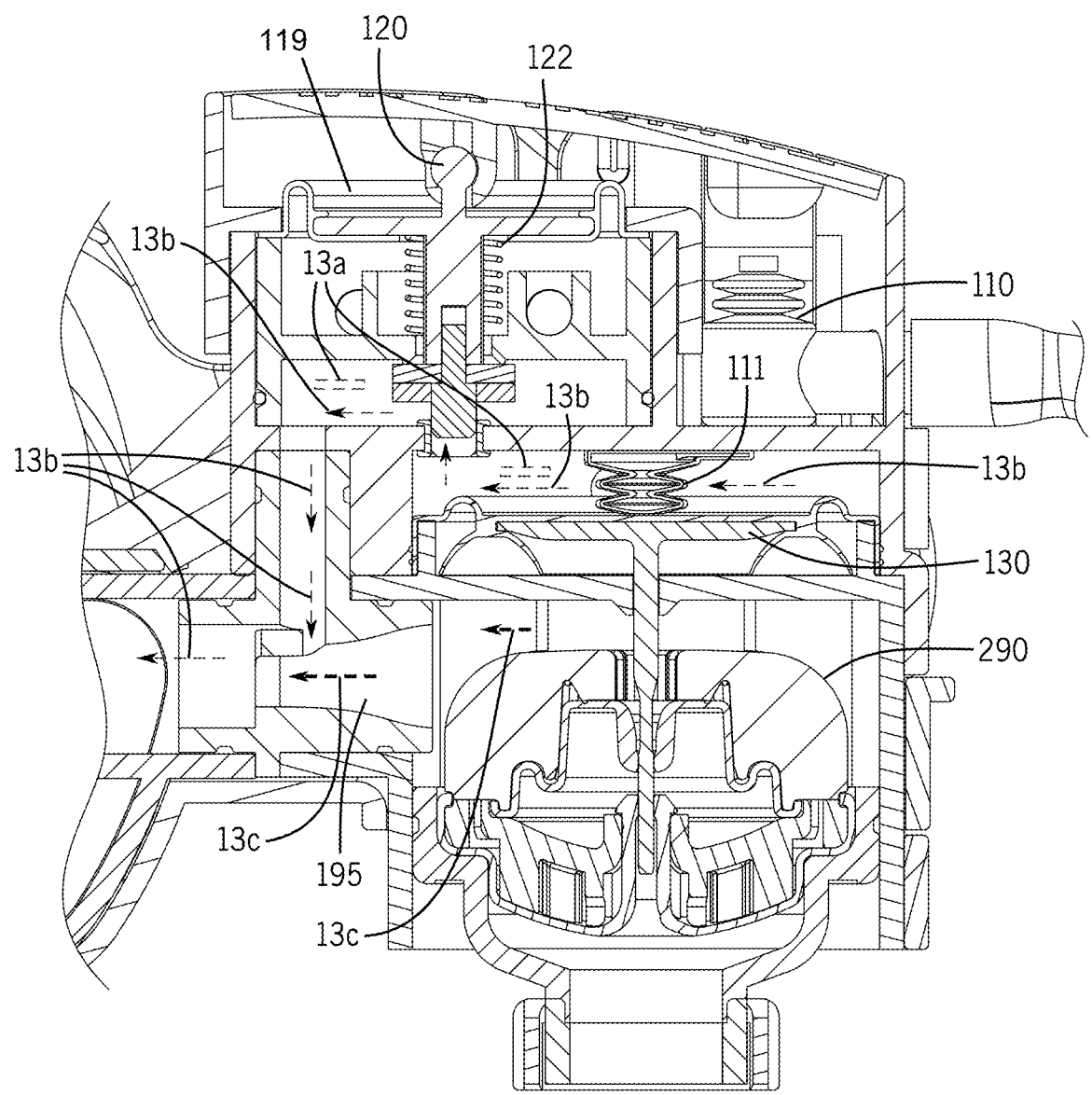

FIG. 14C shows a half flush close and inlet valve assembly 100 close stage 3 state, with bellows 110 retracted, poppet valve 119 popped up by the spring 122, and with the fill vent tube closed by the fluid level, and the stem 130 pulled up. Negative pressure is formed on the output side of the poppet valve 119 and the output side of the fill side as fluid flows through the venturi valve 195 and draws remaining air into the flow.

Figure 14D:
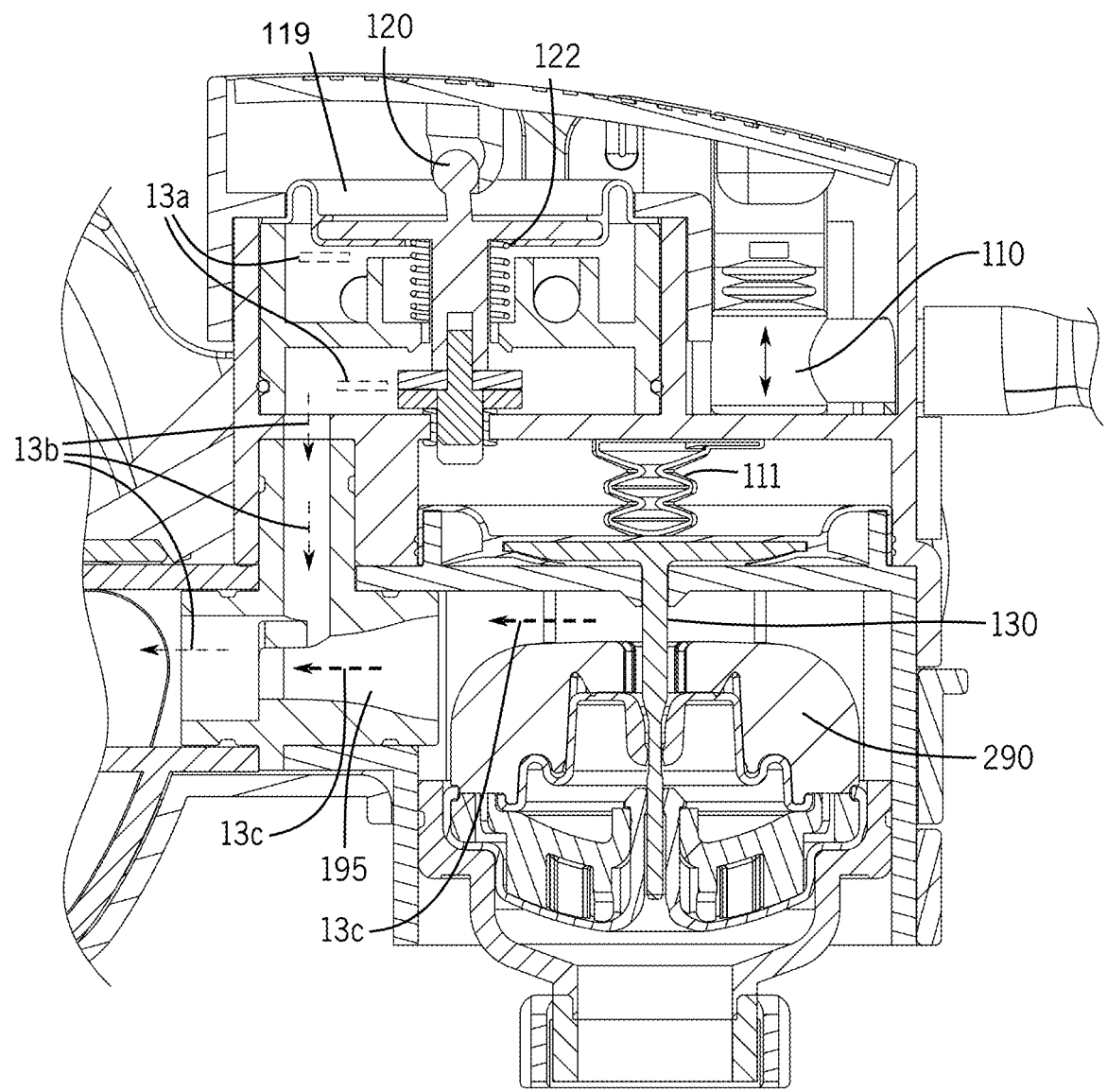
Figure 14E:
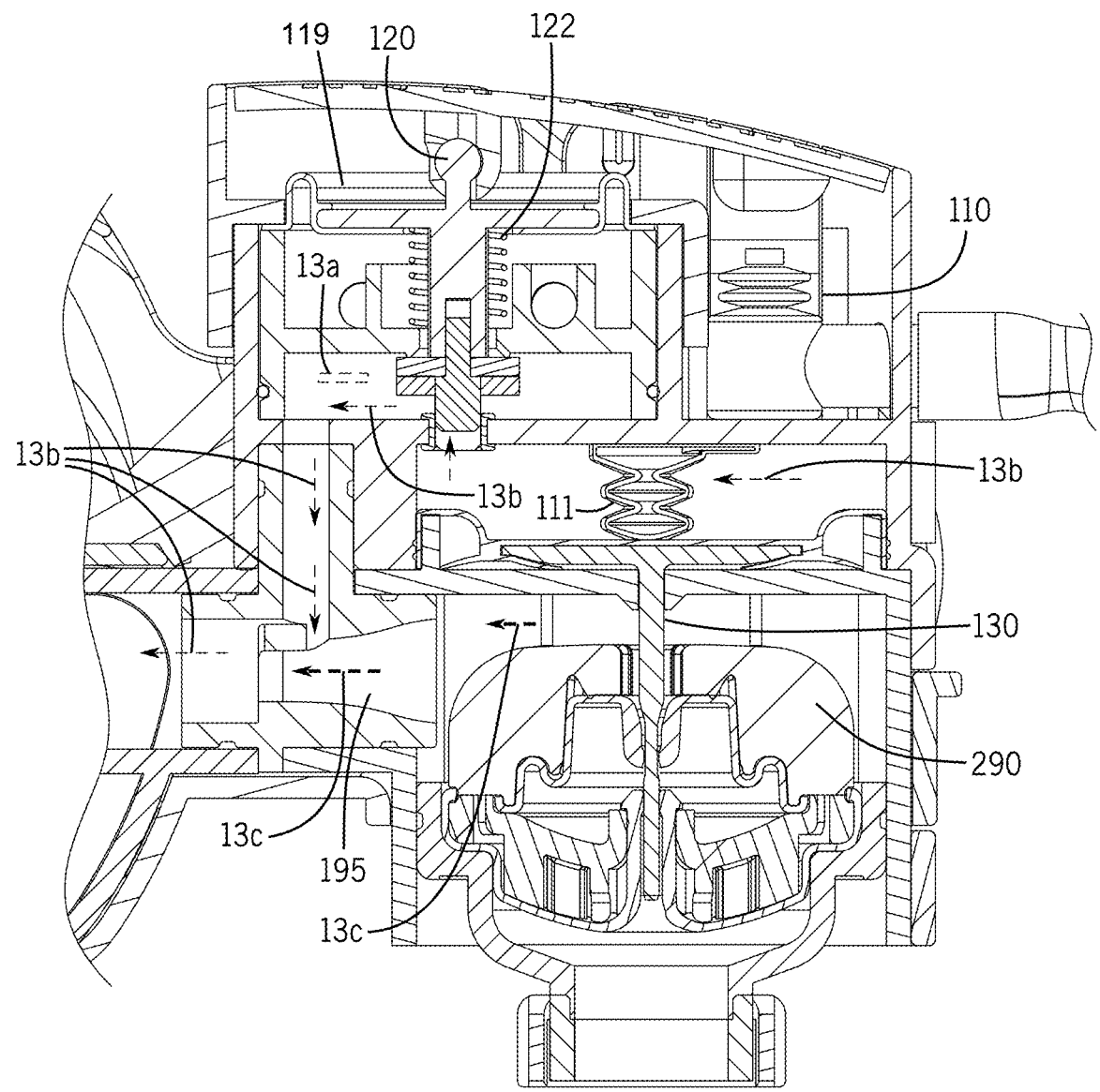
Figure 14F:
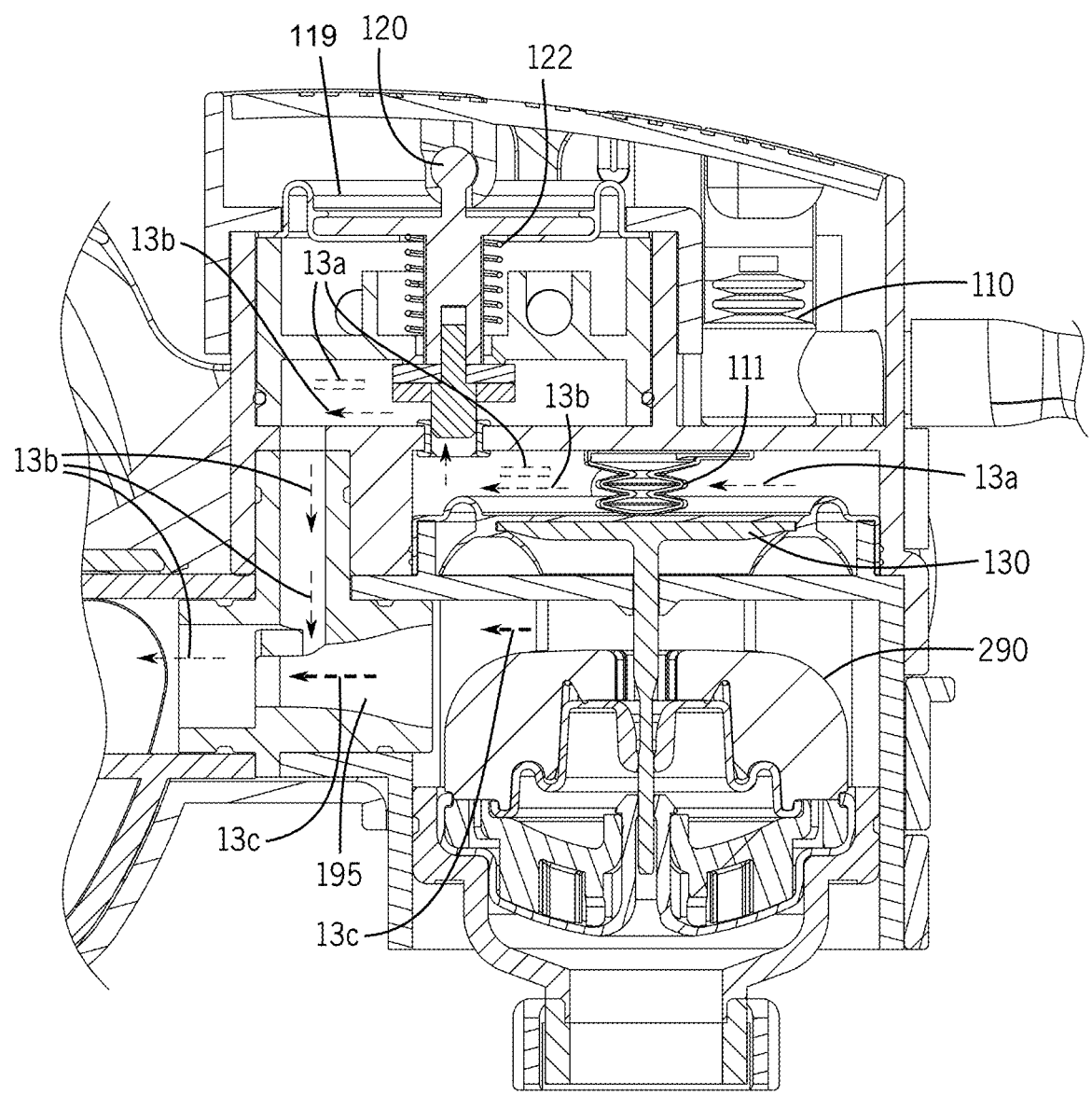

In reference to FIG. 14D showing a full flush open configuration with both bellows 110, 111 activated stage 1 state, in this instance, the bellows 110, 111 are expanded and the stem 130 is pulled down. Fluid can then flow into the inlet valve assembly 100 and through the venturi valve 195 drawing air from the poppet valve 119 output side and creating negative pressure. In a full flush close configuration with both bellows activated stage 2 state (FIG. 14E), the poppet 120 is pulled up by the spring 122 and vacuum pressure is released when the fluid level drops below the full flush vent sensor. Negative pressure is formed on the output side of the poppet valve 119 as fluid flows through the venturi valve 195, and draws remaining air into the flow with the stem 130 pushed down. In reference to FIG. 14F, showing a full flush close configuration and inlet valve assembly 100 close stage 3 state, the stem 130 is pulled up and the fill vent tube is closed by the fluid level, with negative pressure formed on the output side of the inlet valve assembly 100 and poppet valve 119 (in the popped-up state with atmospheric pressure on the input side of the poppet valve 119).

In reference to FIGS. 15-20, in some non-limiting embodiments, the flush and inlet valve assembly 10 can be installed into a fluid tank or cistern, or other fluid reservoir. In some embodiments, the flush and inlet valve assembly 10 can be mounted or coupled (i.e., installed) to or inside a fluid tank or cistern, or other fluid reservoir using a conventional mounting assembly (e.g., such as with a cleat including a flush seal). In some embodiments, flush and inlet valve assembly 10 can be secured to a base of the fluid tank or cistern, or other fluid reservoir. Further details of methods of various assemblies and installation are shown in FIGS. 16-20 and described below.

Figure 15:
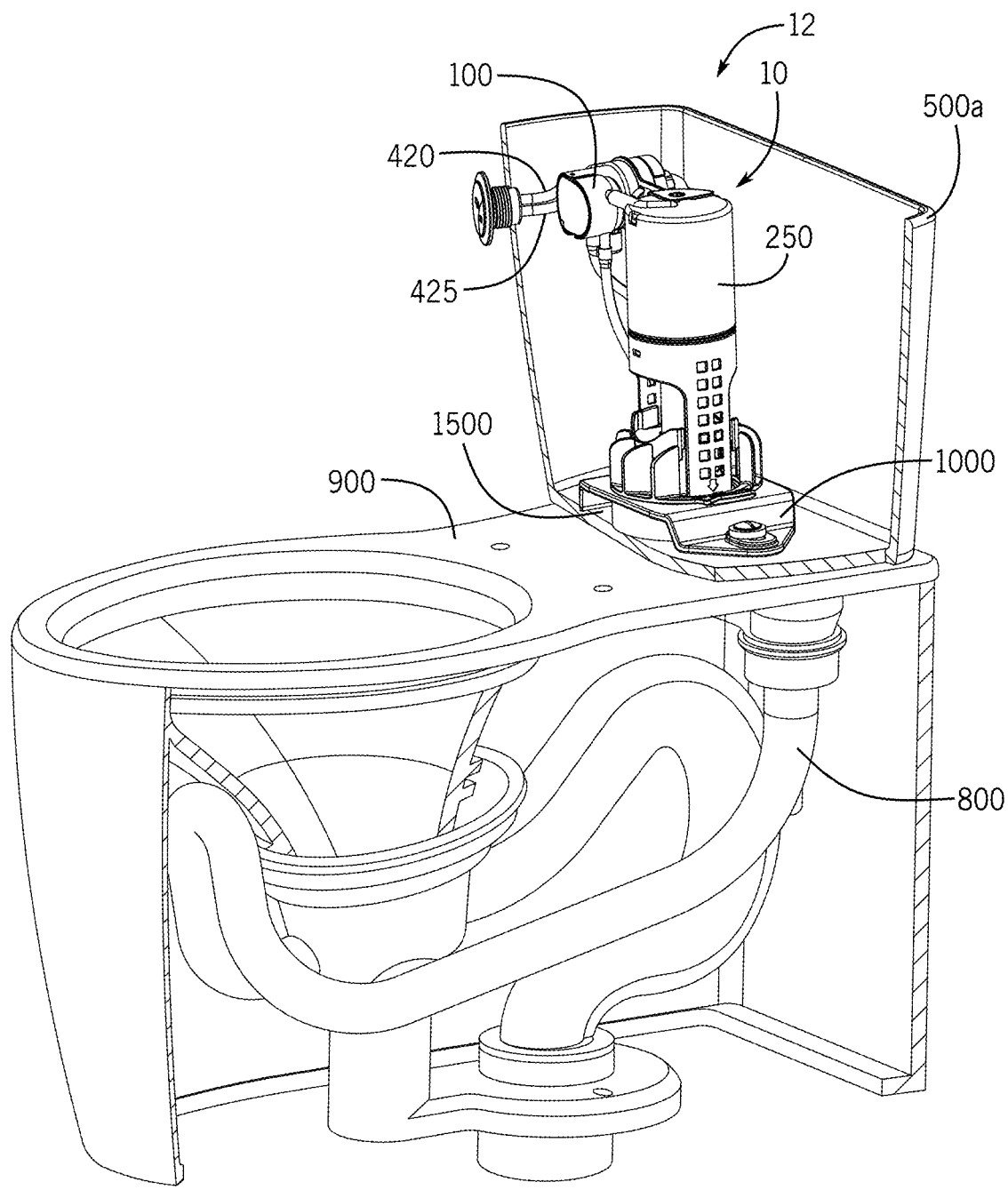
FIG. 15 illustrates a partial cutaway view of a toilet system in accordance with some embodiments of the invention.

Some embodiments of the invention include a toilet or toilet assembly including an installed, pre-installed, integrated, and/or coupled flush and inlet valve assembly 10 (including any of the flush assemblies described herein). For example, in reference to FIG. 15, illustrating a partial cutaway view of a toilet system in accordance with some embodiments of the invention, some embodiments include a toilet system 12 including a coupled or integrated fluid tank or cistern 500*a* (shown in cutaway view to enable viewing of the installed or integrated flush and inlet valve assembly 10). As further described in FIG. 16 below, in some embodiments, the fluid tank or cistern 500*a* can include a molded cleat 1000 that includes an aperture 1005 that can be positioned around an outlet 850 of the fluid tank or cistern 500*a*, and coupled with a flush and inlet valve assembly 10 as described above.

In some embodiments, any of the flush assemblies described herein can be coupled to a hydraulic toilet system interfacing with the ceramic of the toilet for the purposes of mounting and directing fluid as necessary, and in some embodiments, can include the fluid in the bowl. In some embodiments, any of the flush assemblies described herein can utilize precision (e.g., plastic or polymer) manufacturing where the performance demands the precision. For example, as flush volumes are required to decrease, fluid flow characteristics must be enhanced to provide satisfactory flush performance. Conventional ceramic manufacturing techniques do not provide the ability to maintain accurate dimensional control with small tolerances. Using materials which can be fabricated with excellent dimensional control for those components where fluid flow characteristics must be carefully controlled can allow the use of coarse (ceramic) manufacturing technologies where toilet aesthetics, strength, and (harsh) chemical wear durability are required. As just one example, the decorative aspects of a toilet can be fabricated using ceramic materials which can enclose or be coupled to accurately fabricated plumbing components.

In some embodiments, any of the flush assemblies described herein can fluidly couple one or more hydraulic toilet sub-systems from the incoming fluid through to the waste fluid exit (e.g., through pipe 800 shown in FIG. 15). The fluids described herein can be a gas, e.g. air or a liquid, e.g. water. In some embodiments, the coupling can be a direct fluid contact and/or via communication via diaphragms, valves, bellows, or other devices.

Figure 16:
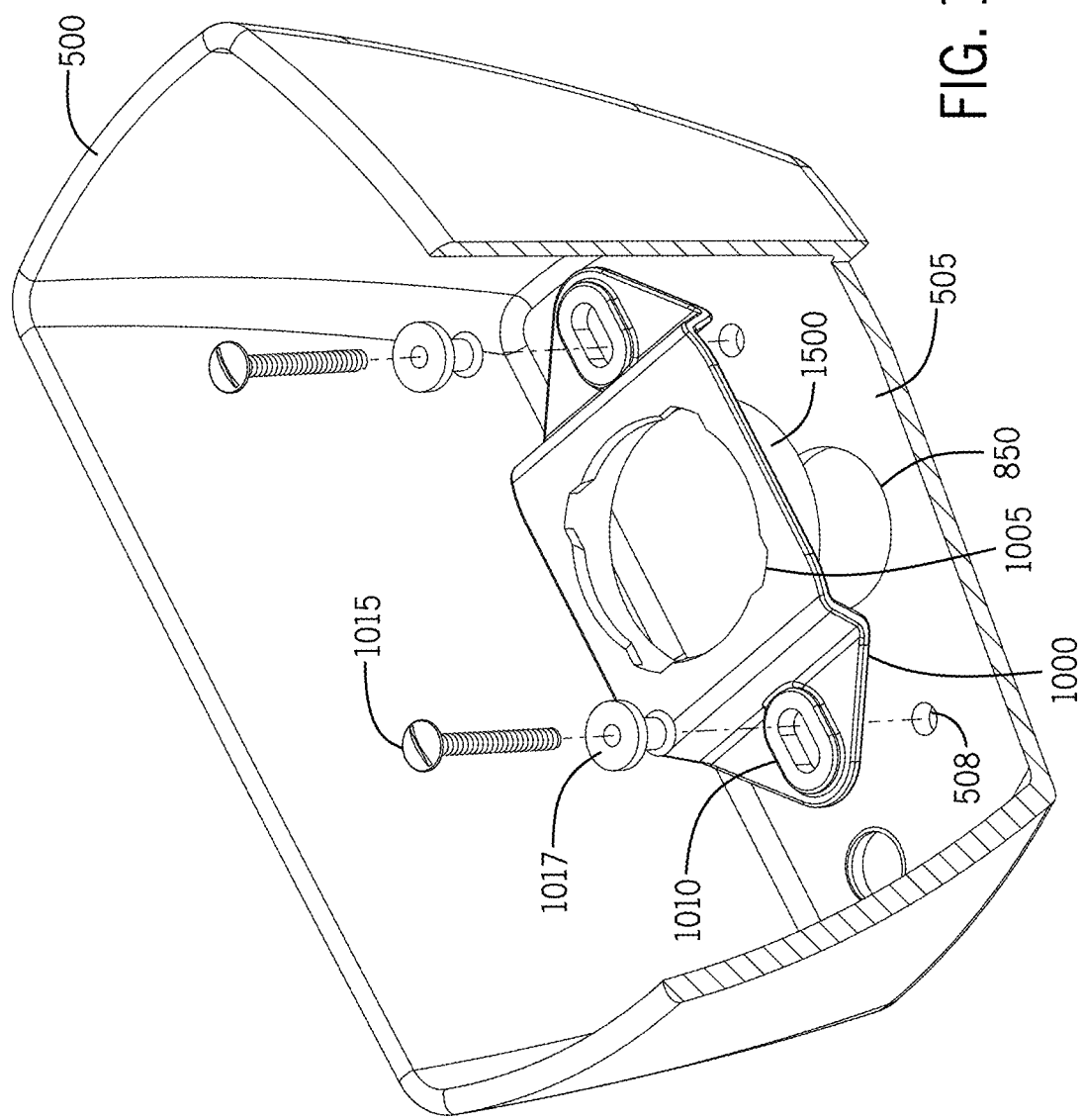
FIG. 16 illustrates an initial installation step in accordance with some embodiments of the invention.
Figure 17:
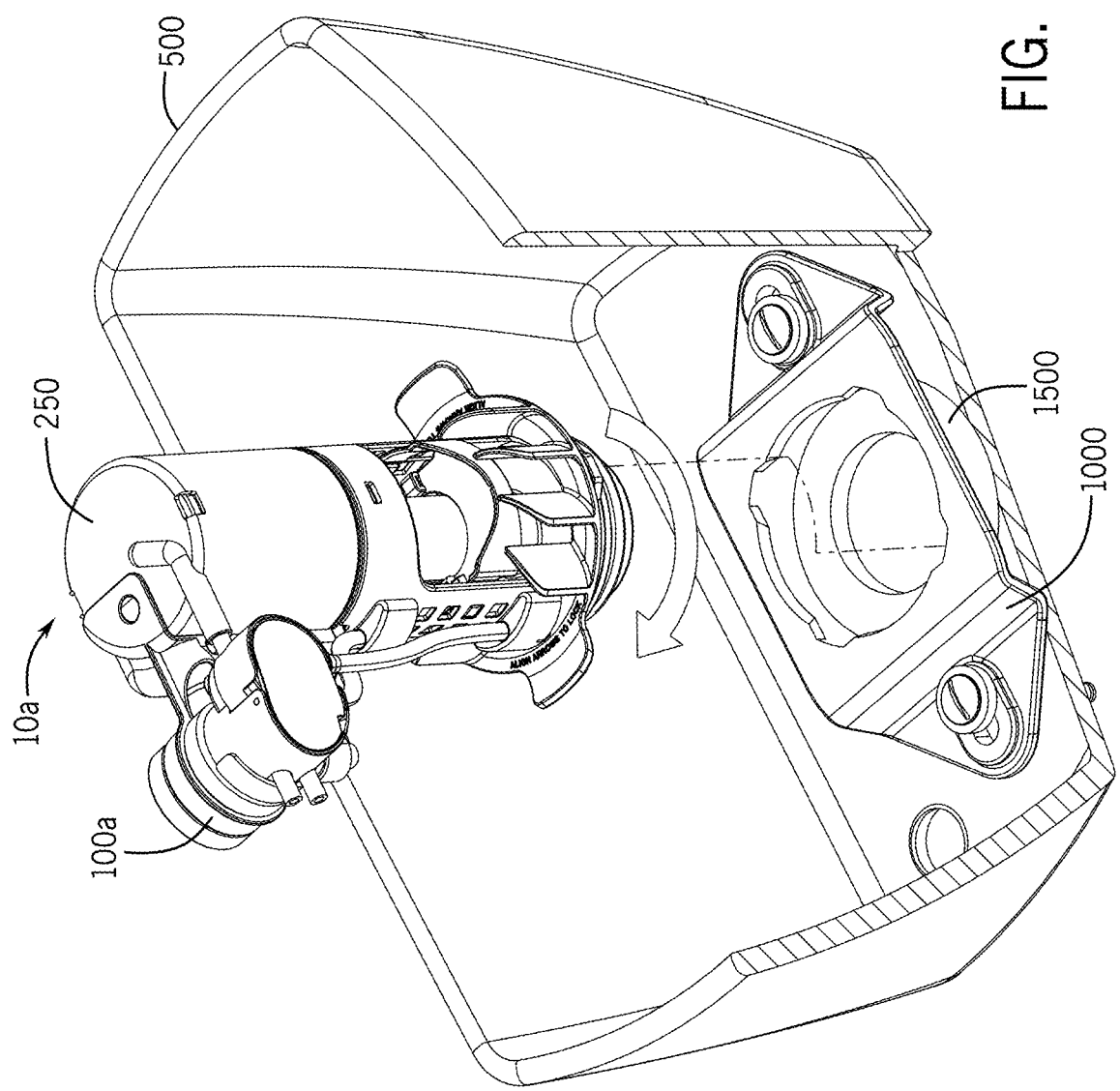
FIG. 17 illustrates an assembly step in accordance with some embodiments of the invention.

FIG. 16 illustrates an initial installation step in accordance with some embodiments of the invention. Some embodiments include a cleat that can provide an interface between any one of the flush assemblies described herein, and the base of a fluid tank or cistern. For example, some embodiments include a molded cleat 1000 that includes an aperture that can be positioned around an outlet 850 of a fluid tank or cistern 500, 500*a*. In some embodiments, the molded cleat 1000 can include molded portions that extend away from the aperture 1005 that can be coupled or sealed against the base of a fluid tank or cistern 500, 500*a*. For example, some embodiments include one or more apertures 1010 that can be used to secure the cleat 1000 to the base 505 of the tank or cistern 500. Some embodiments can use sealing bolts 1015 including a sealing boot 1017 that can at least partially extend through the molded cleat 1000 and secured to apertures 508 in the fluid tank or cistern 500.

In some embodiments, the flush and inlet valve assembly 10 can comprise an inlet valve assembly and outlet valve assembly that are assembled or coupled together prior to mounting or coupling to a fluid tank or cistern, or after mounting or coupling to a fluid tank or cistern. Some non-limiting embodiments can comprise an outlet valve assembly 250 removably coupled to an inlet valve assembly 100. For example, in some embodiments, fluid connections from the inlet valve assembly 100 can be coupled to one or more supply lines and/or vacuum lines of the outlet valve assembly 250 to enable fluid flow between the outlet valve assembly 250 and the inlet valve assembly 100. In some other embodiments, the outlet valve assembly 250 can be coupled to the inlet valve assembly 100, and in other embodiments, the inlet valve assembly 100 can be integrated with the outlet valve assembly 250.

In some embodiments, following installation of the cleat 100 as described earlier with respect to FIG. 16, a partially or fully assembled flush and inlet valve assembly 10 can be mounted to a fluid reservoir, fluid tank, cistern and/or toilet assembly. Some embodiments include a flush and inlet valve assembly 10 comprising an inlet valve assembly and outlet valve coupled together after or during mounting or coupling to a fluid tank or cistern. In some further embodiments, the flush and inlet valve assembly 10 can include an integrated inlet valve assembly and outlet valve that can be mounted or coupled to a fluid tank or cistern. In some embodiments, the flush and inlet valve assembly 10 can comprise a coupled inlet valve assembly and outlet valve that can be coupled with a fill activator prior to mounting or coupling to a fluid tank or cistern. In some embodiments, once assembled, the assembled flush and inlet valve assembly 10 can be mounted or coupled to a fluid tank or cistern. For example, in some embodiments, the flush and inlet valve assembly 10 can comprise an inlet valve assembly and outlet valve assembly that are coupled together after, or during mounting or coupling to a fluid tank or cistern. In some embodiments, the flush and inlet valve assembly 10 can comprise a coupled inlet valve assembly and outlet valve that can be coupled with a fill activator prior to mounting or coupling to a fluid tank or cistern, or a partially assembled flush and inlet valve assembly 10. In some embodiments, once assembled or partially assembled, the assembled or partially assembled flush and inlet valve assembly 10 can be mounted or coupled to a fluid tank or cistern. For example, as illustrated in the non-limiting embodiment of FIG. 17, in some embodiments, the partially assembled flush and inlet valve assembly 10 (shown as flush and inlet valve assembly 10a without supply line 675, connector lines 420, 425, and actuator 400) can comprise an inlet valve assembly 10a and an outlet valve assembly 250 that are coupled together prior to mounting or coupling to a fluid tank or cistern 500.

Figure 18:
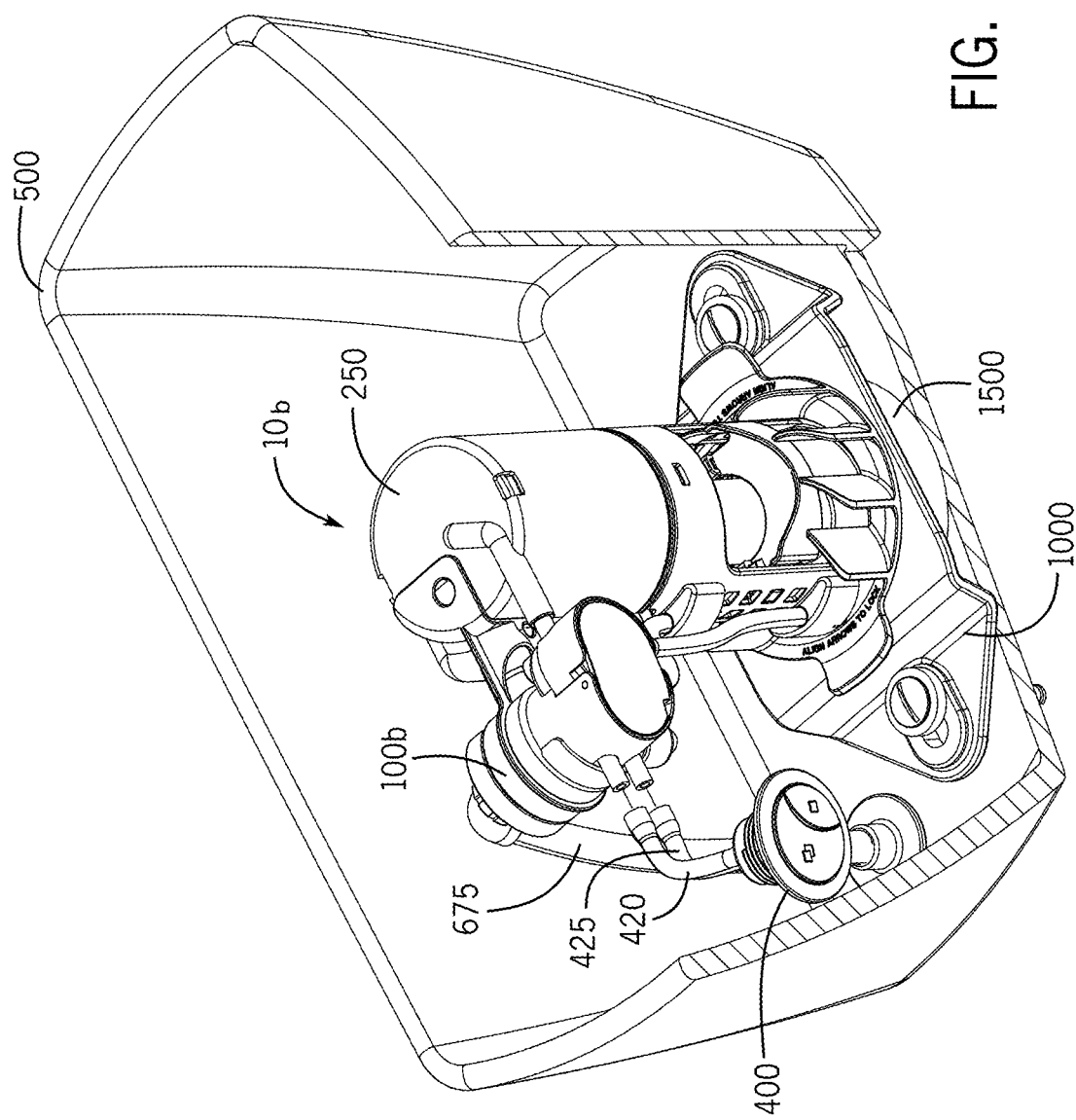
FIG. 18 illustrates a mounting step in accordance with some embodiments of the invention.

In reference to FIG. 18, illustrating a mounting step in accordance with some embodiments of the invention, in some embodiments, the supply line 675 can be installed and coupled to the inlet valve assembly 100b that is coupled to the outlet valve assembly 250. In some embodiments, the supply line 675 can be pre-installed to the fluid tank or cistern 500 or can be installed after the flush and inlet valve assembly 10b is installed to a fluid tank or cistern 500. In some embodiments, the actuator 400 can be coupled to the inlet valve assembly 100b by coupling connector lines 420, 425 after coupling or mounting of the flush and inlet valve assembly 10b to the fluid tank or cistern 500 (as depicted in FIG. 18), or before being mounted to the fluid tank or cistern 500.

Figure 19:
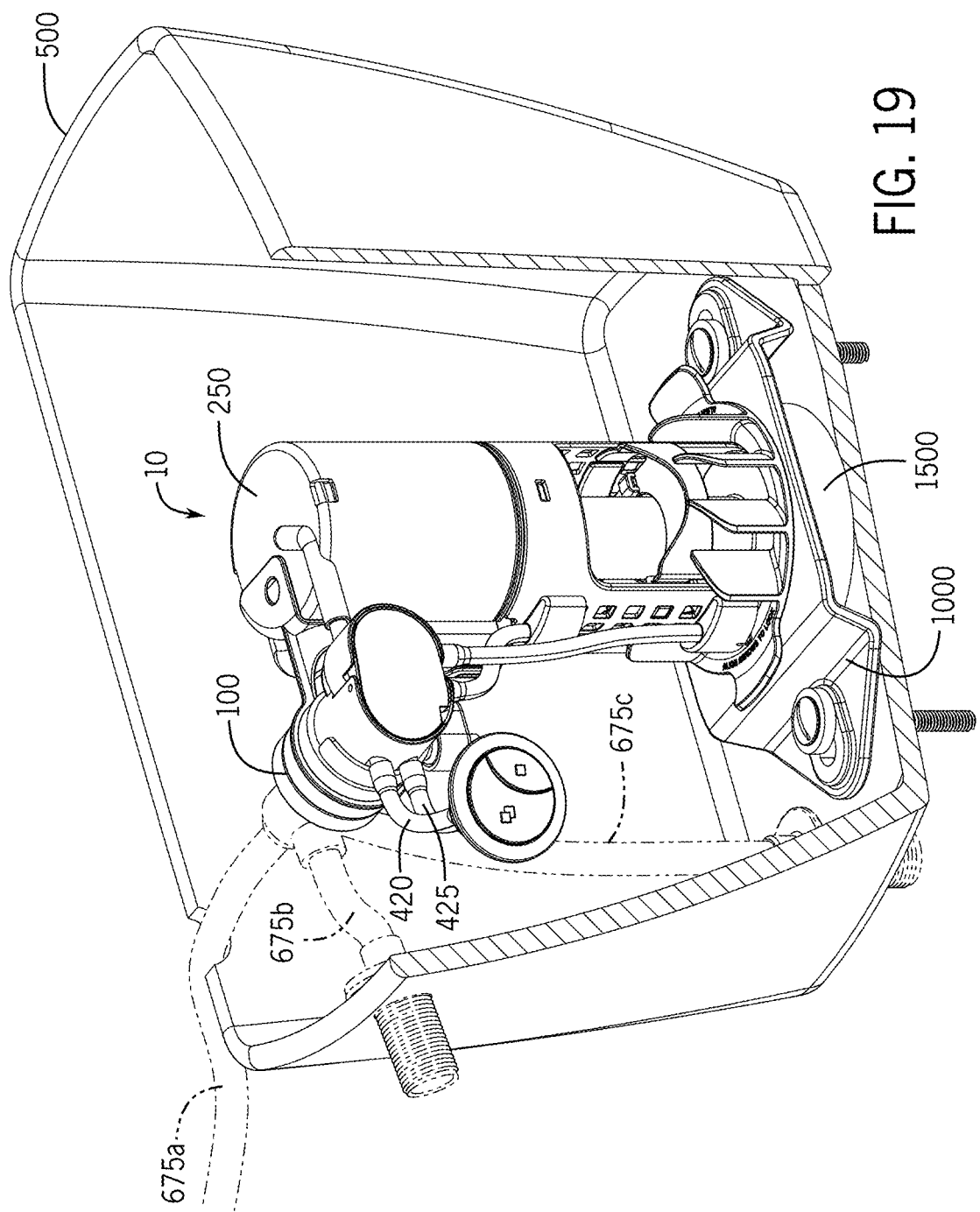
FIG. 19 illustrates supply line variants in accordance with some embodiments of the invention.

The supply line can be mounted to various regions of a fluid tank or cistern. For example, FIG. 19 illustrates supply line variants in accordance with some embodiments of the invention. In some embodiments, the supply line 675 extending from the inlet valve assembly 100 can be coupled to at least one side of a coupled fluid tank or cistern 500. For example, in some embodiments, the supply line 675 can enter the tank 500 from the bottom of the tank (675c). In other embodiments, the supply line 675 can enter the tank from one left or right side or a front or back side of the tank (see example embodiments showing supply line 675b and 675a).

Figure 20:
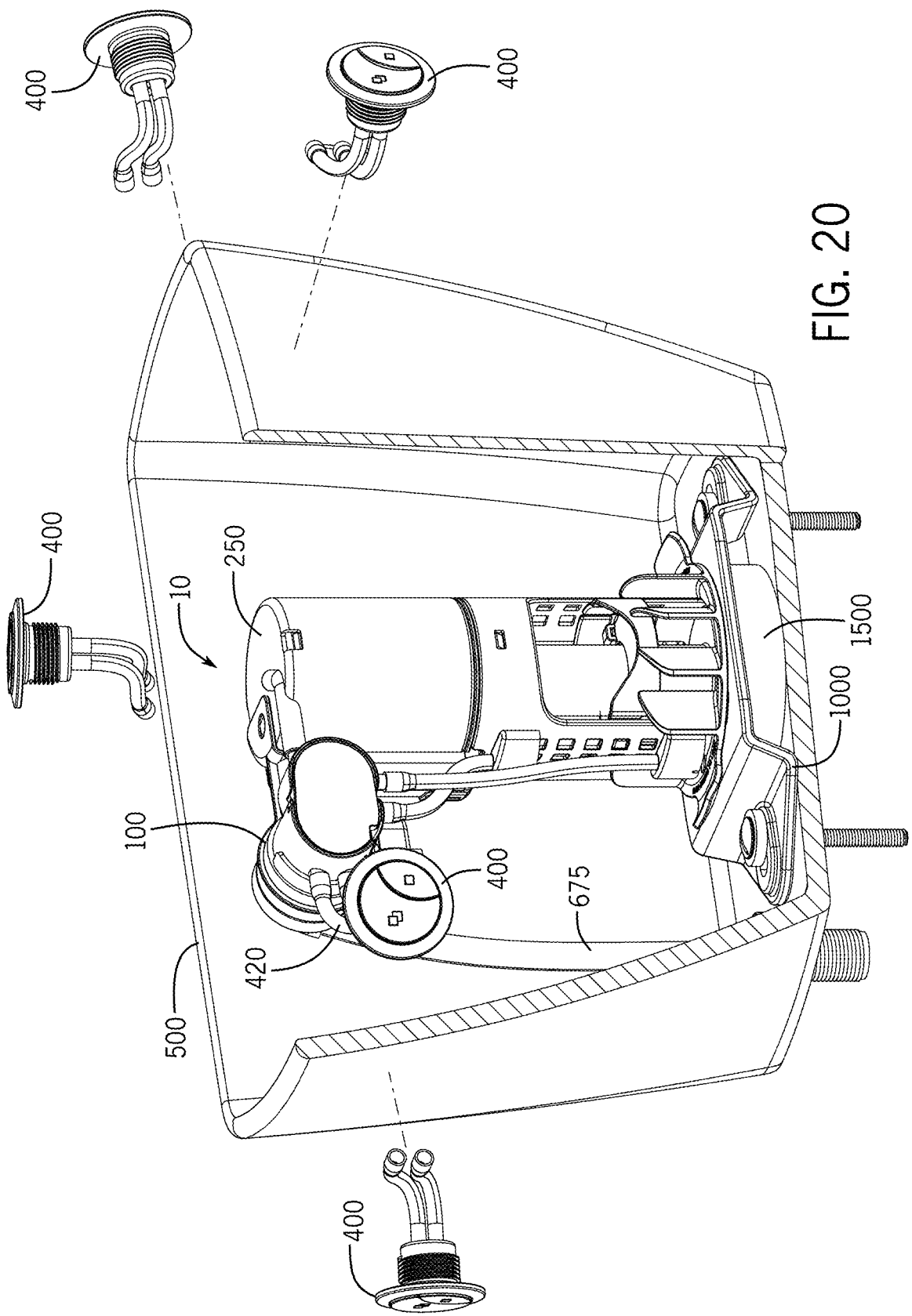
FIG. 20 illustrates activator mounting variants in accordance with some embodiments of the invention.

FIG. 20 illustrates actuator mounting variants in accordance with some embodiments of the invention. In some embodiments, the actuator 400 can be mounted through the tank or cistern 500 through side left, from right, side right, in top, or remotely located arrangements as depicted. As non-limiting embodiments, the actuators 400a, 400b, 400c 400d are represented as exploded assembly views with tank or cistern 500 representing actuator 400 once assembled as part of the inlet valve assembly 100.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description above.

The invention claimed is:

1. A fluid control system comprising:
   an outlet valve assembly;
   an inlet valve assembly including a venturi inlet valve;
   an actuator coupled to the inlet valve assembly, the actuator configured to enable a user to control and adjust a flush volume of fluid control system;
   a moveable float positioned in a chamber of the outlet valve assembly, the chamber including a variably-sized upper portion, wherein the volume of the upper portion is based at least in part on a variable position of the moveable float in the chamber;
   an adjustable first control valve coupled to an outer surface of the outlet valve assembly, the first control valve being fluidly coupled to the inlet valve assembly, the first control valve comprising an inverted cup coupled to a channel that is fluidly coupled to the inlet valve assembly, wherein based on a position of the first control valve on an outer surface of the outlet valve, the first control valve is configured and arranged to control access of at least a portion of the inlet valve assembly to an open atmosphere based at least in part on an initial fluid level of fluid in a reservoir in which the fluid control system is at least partially positioned;
   an adjustable second control valve movably coupled to an outer surface of the outlet valve assembly, the second control valve fluidly coupled to the inlet valve assembly; and
   a bellows positioned coupled to the variably-sized upper portion, the bellows fluidly coupled to the venturi inlet valve and at least one of the first and the second control valves.

2. The fluid control system of claim 1, wherein the second control valve comprises an inverted cup coupled to a channel that is fluidly coupled to the inlet valve assembly, wherein based on a position of the second control valve on an outer surface of the outlet valve, the second control valve is configured and arranged control access of at least a portion of the inlet valve assembly to an open atmosphere based at least in part on a residual fluid level of fluid in a reservoir in which the fluid control system is at least partially positioned.

3. The fluid control system of claim 1, further comprising a supply line coupled to the inlet valve assembly, the supply line configured to be coupled to a fluid supply configured to route outside of a fluid reservoir or at least partially route inside a fluid reservoir.

4. The fluid control system of claim 1, wherein the actuator comprises a push-button activation enabling opening and closing of one or more valves or vents to enable a controlled flush.

5. The fluid control system of claim 1, wherein the inlet valve assembly comprises valve bellows configured to expand as a result of user-activation of the actuator.

6. The fluid control system of claim 5, wherein the valve bellows are configured to actuate an inlet valve to enable fluid to flow in a fluid path from a fluid supply line.

7. The fluid control system of claim 6, configured and arranged for the fluid path to include the fluid passing through the venturi inlet valve before entering portions of the outlet valve.

8. The fluid control system of claim 5, wherein expansion of the valve bellows is configured to push a pivoted lever that in turn activates a valve.

9. The fluid control system of claim 8, wherein the valve comprises a poppet valve.

10. The fluid control system of claim 8, wherein activation of the valve enables a reduction in atmospheric pressure of the upper portion the outlet valve enclosed by the upper housing.

11. The fluid control system of claim 7, configured wherein a flow of fluid through the venturi inlet valve induces at least a partial vacuum in the bellows, and wherein the variable position of the moveable float is based at least in part on at least one of an atmospheric pressure in the bellows and a fluid pressure force on the moveable float.

12. The fluid control system of claim 11, wherein at least a partial vacuum created in the bellows by a fluid flow through the venturi inlet valve from a supply line enables the moveable float to lift to a least partially cover an input port to the outlet valve resulting in a slowing or stopping of the fluid flow from the supply line.

13. The fluid control system of claim 1, wherein the inlet valve assembly is configured and arranged to be removably coupled to the outlet valve.

14. A fluid controller comprising:
an actuator coupled to a fluid inlet valve assembly;
a fluid supply line coupled to the fluid inlet valve assembly;
an outlet valve assembly removably coupled to the fluid inlet valve assembly;
a float positioned at least partially in an inner housing of the outlet valve assembly, the inner housing at least partially enclosing a variably-sized chamber, wherein a position or movement of the float in the variably-sized chamber is based at least in part on an atmospheric pressure or changing atmospheric pressure in a bellows coupled to the float, and wherein the volume of the variably-sized chamber is based at least in part on the position of the moveable float in the chamber; and a first supply aperture positioned on an outer surface of the outlet valve assembly, the first supply aperture being adjustably coupled to a first channel, the first channel fluidly coupled to the fluid inlet valve assembly, wherein based on a position of the first supply aperture on an outer surface of the outlet valve assembly, the first supply aperture is configured and arranged to control access of at least a portion of the fluid inlet valve assembly to an open atmosphere based at least in part on an initial fluid level of fluid in a reservoir in which the fluid controller is at least partially positioned; and a second supply aperture positioned on an outer surface of the outlet valve assembly, the second supply aperture adjustably coupled to a second channel, the second channel fluidly coupled to the fluid inlet valve assembly.

15. The fluid controller of claim 14, further comprising a venturi inlet valve of the fluid input valve, the bellows configured to be fluidly coupled to the venturi inlet valve, and wherein the venturi inlet valve is configured and arranged to enable fluid flow into portions of the outlet valve assembly.

16. The fluid controller of claim 15, wherein the fluid inlet valve assembly and outlet valve assembly are configured and arranged so that any fluid passing through the venturi inlet valve reduces atmospheric pressure in the bellows.

17. The fluid controller of claim 15, wherein the bellows is fluidly coupled to the venturi inlet valve, and at least one of the first and the second supply apertures.

18. The fluid controller of claim 14, wherein based at least in part on at least one of the position of at least one of the first supply aperture and the second supply aperture, and/or a state of immersion of the at least one of the first supply aperture and the second supply aperture in a fluid of a tank or reservoir, an access of at least a portion of the inlet valve assembly to an open atmosphere is modified, partially closed or completely closed.

19. The fluid controller of claim 18, wherein the partial or full closure of access of at least a portion of the inlet valve assembly to an open atmosphere reduces or prevents fluid from flowing from the fluid supply line into the outlet valve assembly.

* * * * *